US012088000B2

(12) United States Patent
Deng et al.

(10) Patent No.: US 12,088,000 B2
(45) Date of Patent: Sep. 10, 2024

(54) INTERACTIVE WHITE BOARD

(71) Applicant: GUANGZHOU SHIYUAN ELECTRONIC TECHNOLOGY COMPANY LIMITED, Guangzhou (CN)

(72) Inventors: Bingjie Deng, Guangzhou (CN); Guofeng Hong, Guangzhou (CN); Yanxi Chen, Guangzhou (CN)

(73) Assignee: GUANGZHOU SHIYUAN ELECTRONIC TECHNOLOGY COMPANY LIMITED, Guangzhou (CN)

( * ) Notice: Subject to any disclaimer, the term of this patent is extended or adjusted under 35 U.S.C. 154(b) by 143 days.

(21) Appl. No.: 17/992,850

(22) Filed: Nov. 22, 2022

(65) Prior Publication Data

US 2023/0091189 A1 Mar. 23, 2023

Related U.S. Application Data

(63) Continuation of application No. PCT/CN2021/108601, filed on Jul. 27, 2021.

(30) Foreign Application Priority Data

Sep. 22, 2020 (CN) ......................... 202022089665.8

(51) Int. Cl.

| | |
|---|---|
| *H01Q 1/22* | (2006.01) |
| *H01Q 1/48* | (2006.01) |
| *H01Q 1/52* | (2006.01) |
| *H01Q 9/04* | (2006.01) |
| *H01Q 21/06* | (2006.01) |

(52) U.S. Cl.

CPC ............. *H01Q 1/2291* (2013.01); *H01Q 1/48* (2013.01); *H01Q 1/526* (2013.01); *H01Q 9/0407* (2013.01); *H01Q 21/06* (2013.01)

(58) Field of Classification Search

CPC ........ H01Q 1/2291; H01Q 1/48; H01Q 1/526; H01Q 9/0407; H01Q 21/06; H01Q 1/2266; H01Q 1/521; H01Q 9/40; H01Q 21/30; H01Q 23/00; H01Q 1/241; H01Q 1/12; H01Q 1/38; G02F 1/1333

See application file for complete search history.

(56) References Cited

U.S. PATENT DOCUMENTS

2019/0081389 A1* 3/2019 Tsai ....................... H01Q 1/243

FOREIGN PATENT DOCUMENTS

WO WO-2017126418 A1 * 7/2017 ........... H01Q 1/2208

OTHER PUBLICATIONS

Translation of WO-2017126418-A1; 2017 (Year: 2017).*

* cited by examiner

*Primary Examiner* — Renan Luque

(74) *Attorney, Agent, or Firm* — BAYES PLLC

(57) ABSTRACT

An interactive white board includes a display screen, a metal backboard, an antenna assembly, and a mainboard, wherein the metal backboard is located behind the display screen, and is provided with through holes, the antenna assembly is disposed on a surface of the metal backboard facing away from the display screen, and is located in a display region of the display screen, the antenna assembly is disposed directly opposite to the through holes, the mainboard is provided on the surface of the metal backboard facing away from the display screen, and the antenna assembly is electrically connected with the mainboard.

28 Claims, 22 Drawing Sheets

INTERACTIVE WHITE BOARD

CROSS-REFERENCE TO RELATED APPLICATION

The present application is a continuation of International Application No. PCT/CN2021/108601, filed on Jul. 27, 2021, which claims the benefit of priority to Chinese Patent Application No. 202022089665.8, filed on Sep. 22, 2020. The entire contents of each of the above-identified applications are expressly incorporated herein by reference.

TECHNICAL FIELD

The present disclosure relates to the field of antennas, and in particular to an interactive white board.

BACKGROUND

With the development of technology and communication technique, the requirement of screen-to-body ratio of an interactive white board is getting higher and higher, and the development trend is gradually moving closer to a full screen.

The realization of wireless communication function of the interactive white board requires an antenna to radiate and receive electromagnetic signals. As shown in FIG. 1, in the interactive white board, a display screen 1' is surrounded by a frame 2', and a back surface of the display screen 1' is a metal backboard. The connection of the metal backboard and the frame 2' makes the display screen 1', the frame 2' and the metal backboard connect integrally. At present, in the interactive white board, an antenna 3' is disposed inside the interactive white board and is located in a region of the frame 2'.

In the above-mentioned arrangement method of antennas, antennas require a certain clearance region, resulting in an increase in an area of the frame, and it is impossible to realize the design of a narrow frame or even a full screen of an interactive white board.

SUMMARY

The purpose of embodiments of the present disclosure is to provide an interactive white board in order to solve a problem in the existing interactive white board that antennas being designed on the frame makes the interactive white board unable to use a metal frame, and that the interactive white board cannot be designed with a narrow frame or even a full screen.

For this purpose, embodiments of the present disclosure adopt the following technical solutions.

An interactive white board includes a display screen; a metal backboard, wherein the metal backboard is located on a back surface of the display screen, and is provided with through holes; an antenna assembly, wherein the antenna assembly is disposed on a surface of the metal backboard facing away from the display screen, and is located in a display region of the display screen, and is disposed directly opposite to the through holes; and a mainboard, wherein the mainboard is provided on the surface of the metal backboard facing away from the display screen, and is electrically connected with the antenna assembly.

The interactive white board of embodiments of the present disclosure includes a display screen, a metal backboard, an antenna assembly, and a mainboard, wherein the metal backboard is located behind the display screen and is provided with through holes, the antenna assembly is provided on a surface of the metal backboard facing away from the display screen, and is located in the display region of the display screen, the antenna assembly is disposed directly opposite to the through holes, the mainboard is provided on the surface of the metal backboard facing away from the display screen, and the antenna assembly is electrically connected with the mainboard. In embodiments of the present disclosure, the antenna assembly is disposed in the display region of the display screen, and can radiate signals forward through the through holes on the metal backboard and the display screen, without occupying a frame region of the interactive white board, such that the frame can be made narrower, which improves a screen-to-body ratio of the interactive white board and even realizes a full-screen design.

BRIEF DESCRIPTION OF THE DRAWINGS

Thereinafter, the present disclosure will be further described in detail according to the accompanying drawings and embodiments.

IN THE FIGURES

Figure 1:
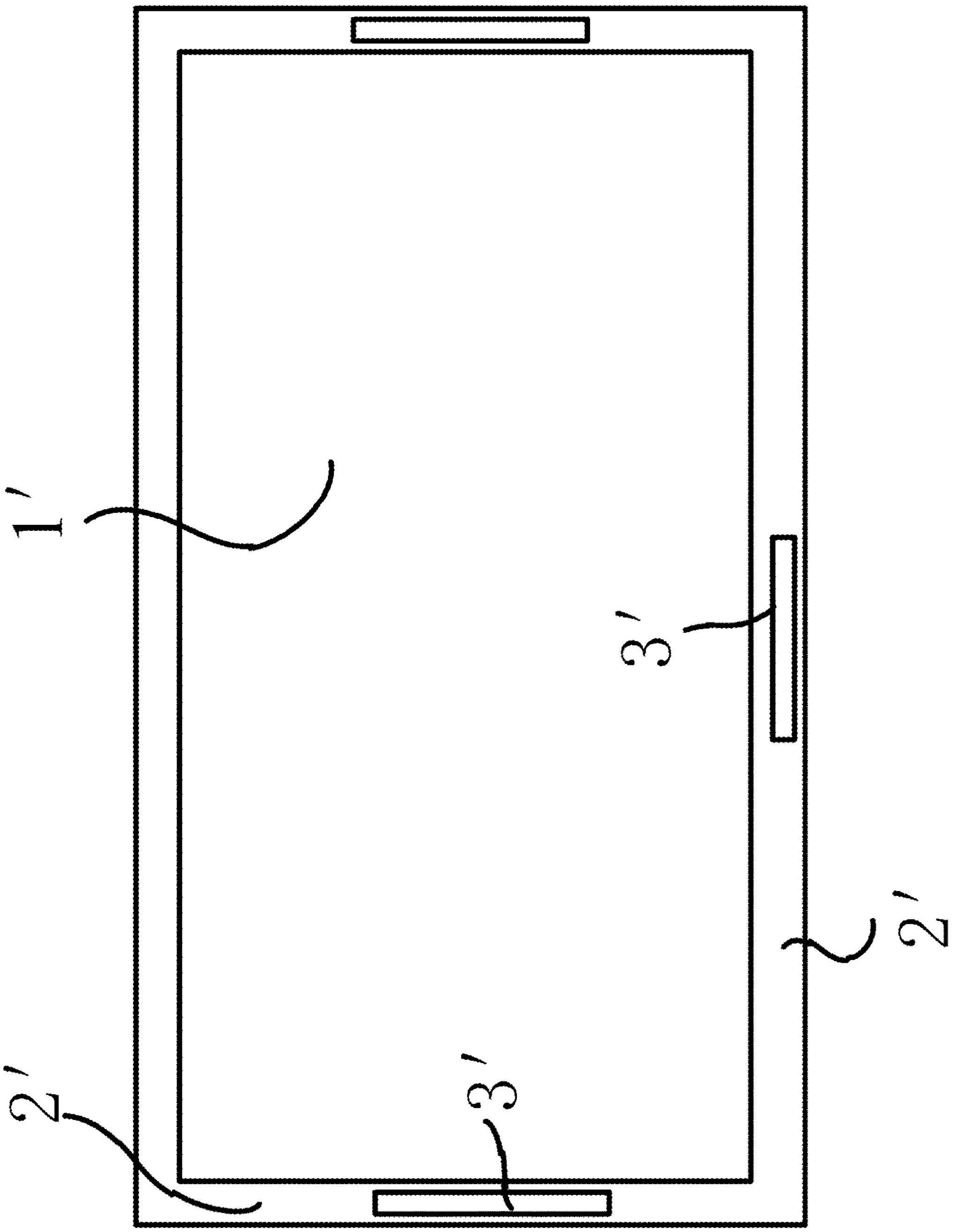
FIG. 1 is a schematic diagram of an antenna layout of an interactive white board in the related art.

1, Display screen; 11, Display layer; 12, Backlight layer; 121, Light bar; 2, Metal backboard; 21, Through hole;

22, Extruded hole; 23, Bulge; 3, Antenna assembly; 31, Dielectric substrate; 311, Lock hole; 32, Antenna unit; 321, First antenna unit; 3211, First feeder stub; 3212, First L-shaped stub; 32121, First stub; 32122, Second stub; 3213, First T-shaped stub; 32131, Third stub; 32132, Fourth stub; 3214, First ground stub; 32141, Fifth stub; 32142, Sixth stub; 3215, First boundary; 3216, Second boundary; 3217, Third boundary; 3218, L-shaped ground stub; 32181, Ninth stub; 32182, Tenth stub; 322, Second antenna unit; 3221, Second feeder stub; 3222, Second L-shaped stub; 32221, Seventh stub; 32222, Eighth stub; 3223, Second T-shaped stub; 3224, Second ground stub; 3225, Fourth boundary; 33, Radio frequency chip; 34, Second metal shielding cover; 35, First metal shielding cover; 36, First signal transmission line; 37, Surface covered with copper; 38, First square clearance region; 39, Second square clearance region; 40, Second signal transmission line; 4, Frame; 5, Metal back cover; 6, Mainboard; 7, Decorative piece.

DETAILED DESCRIPTION

In order to make the technical problems to be solved, the technical solutions to be adopted and the technical effects to be achieved by the present disclosure clearer, the technical solutions of embodiments of the present disclosure will be further described in detail hereinafter in combination with the accompanying drawings. Obviously, the described embodiments are only a part of embodiments of the present disclosure, not all of embodiments of the present disclosure. Based on the embodiments of the present disclosure, all other embodiments obtained by those skilled in the art without creative work belong to the claimed scope of the present disclosure.

In the description of the present disclosure, unless otherwise specified and limited, the terms “connected with/to,” “connected” and “fixed” should be interpreted broadly. For example, they can be fixedly connected, detachably connected, or integrated. It can be a mechanical connection or an electrical connection. And they can be directly connected or indirectly connected through an intermediate medium, or they can be the connection between two components or the interaction relationship between two components. For those skilled in the art, the concrete meaning of the above-mentioned terms in the present disclosure can be understood under concrete circumstances.

In the present disclosure, unless expressly stipulated and defined otherwise, a first feature being “above” or “below” a second feature may comprise that the first feature directly contacts with the second feature, or may comprise that the first feature does not directly contact with the second feature, rather than contact through another feature among them. Moreover, the first feature being “above,” “over,” and “on” the second feature may comprise that the first feature is directly above and obliquely above the second feature, or simply means that the level of the first feature is higher than that of the second feature. The first feature being “below,” “under,” and “underneath” the second feature comprises that the first feature is directly below and obliquely below the second feature, or simply means that the level of the first feature is smaller than that of the second feature.

As shown in FIGS. 2-6, an embodiment of the present disclosure provides an interactive white board, and the interactive white board comprises a display screen 1, a metal backboard 2, an antenna assembly 3, and a mainboard (not shown).

The interactive white board in the embodiment of the present disclosure may be an electronic device with functions such as writing, annotation, painting, multimedia entertainment, and network conference. The interactive white board can integrate many technologies such as human-computer interaction, panel display, multimedia information processing and network transmission, and can be used in scenes such as office, teaching, and interactive presentation of pictures and texts.

Figure 3:
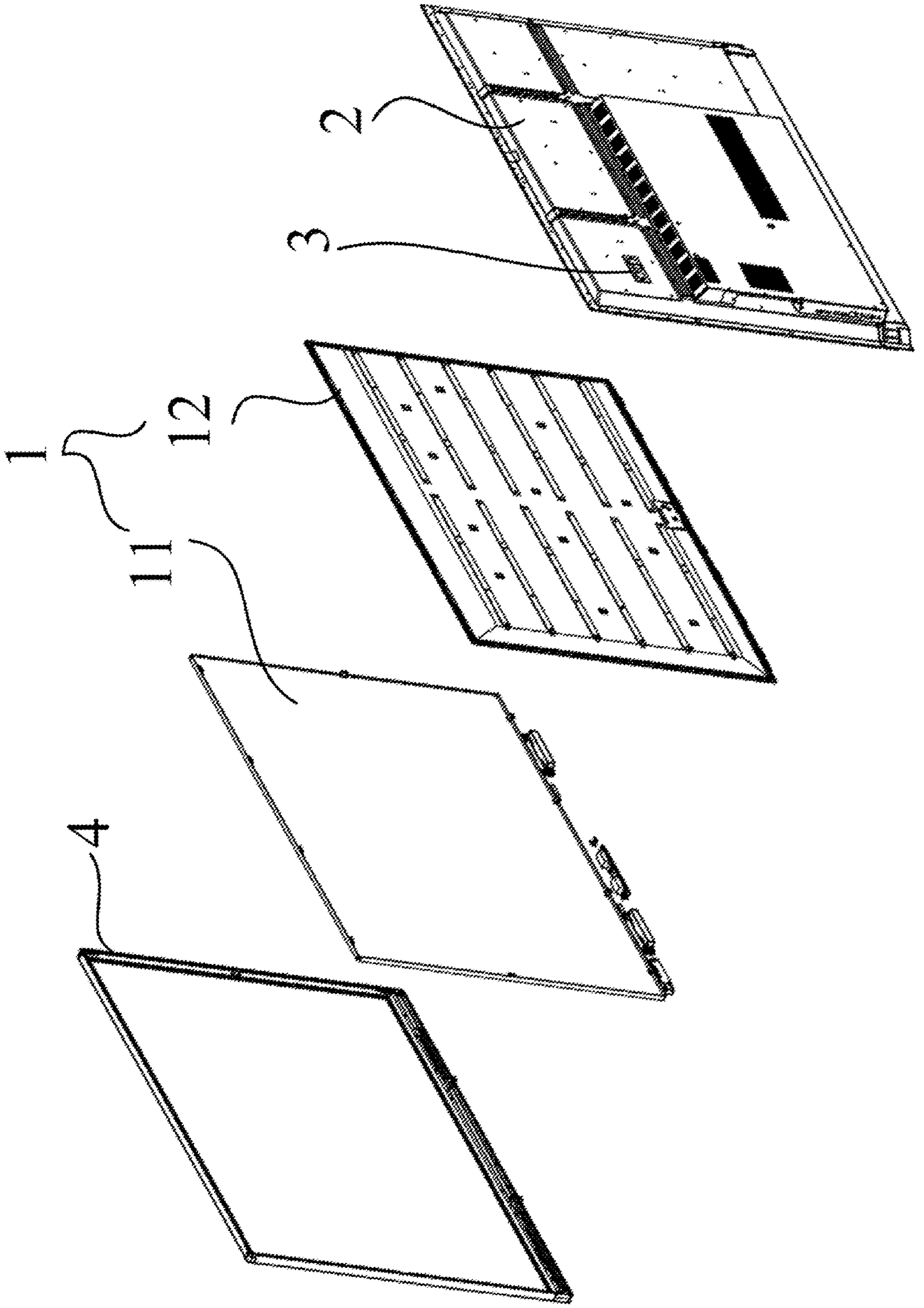
FIG. 3 is an exploded schematic diagram of an interactive white board in an embodiment of the present disclosure.
Figure 4:
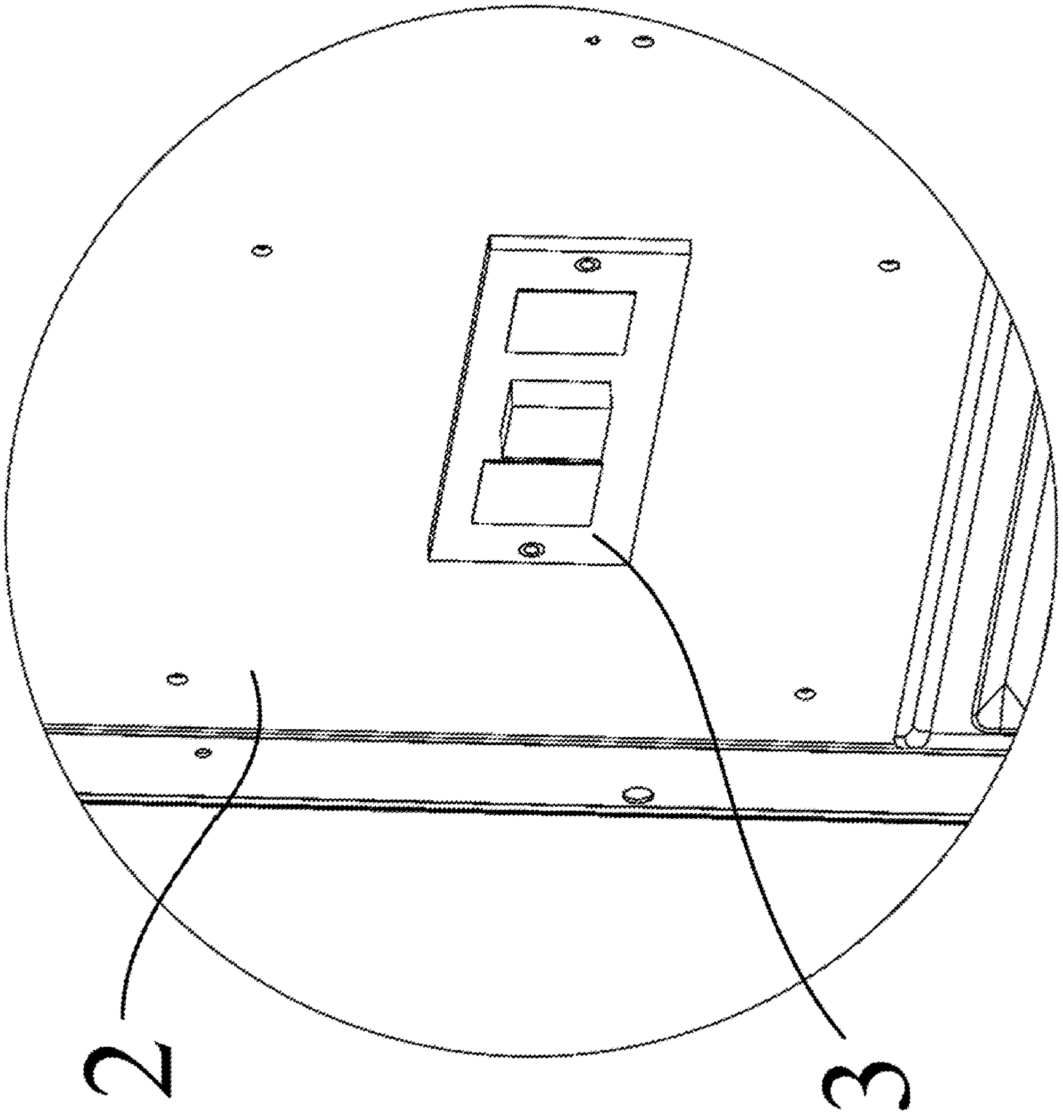
FIG. 4 is the schematic diagram of Part A in FIG. 3.

As shown in FIG. 3, the interactive white board can further include a frame 4. The display screen 1 is embedded in the frame 4, and the metal backboard 2 is located on a back surface of the display screen 1. After the metal backboard 2 is mechanically connected with the frame 4, the display screen 1, the frame 4, and the metal backboard 2 are connected integrally. In some implementations, the interactive white board may further include components such as a speaker and a heat sink.

In some implementations of the present disclosure, the display screen 1 may be a touch display screen, that is, the display screen 1 may include a backlight layer 12, a display layer 11 and a touch layer (not shown). The backlight layer 12 may a physical layer providing a light source required for display. The display layer 11 may be a liquid crystal display layer. The touch layer may be a capacitive touch layer, an infrared touch layer, or the like.

The metal backboard 2 may be a component located on the back surface of the display screen 1 for supporting and protecting the display screen 1. In an embodiment, the metal backboard 2 can have a specific structure after being cut and stamped from a steel plate, so that the metal backboard 2 can be connected with the frame 4 and a certain space is provided between the metal backboard 2 and the display screen 1 so as to accommodate components such as speakers and heat sinks.

The antenna assembly 3 can be an assembly for radiating and receiving wireless signals. The mainboard is provided on a surface of the metal backboard 2 facing away from the display screen 1. The antenna assembly 3 is electrically connected with the mainboard. Exemplarily, the antenna assembly 3 can be electrically connected with the mainboard through a signal transmission line. In some implementations, the antenna assembly 3 can be an antenna assembly with functions such as Wi-Fi, wireless access point, Bluetooth, etc. In some implementations, the antenna assembly 3 can be a Wi-Fi antenna assembly, and a first radiation frequency band of the antenna assembly 3 is Wi-Fi 2.4G (2.4 Ghz~2.5 GHz) frequency band, a second radiation frequency band is Wi-Fi 5G frequency band, wherein 2.4G frequency band has strong anti-attenuation capability in indoor environment, good capability of penetrating walls, 5G (4.9 GHz~5.9 GHz) frequency band has a strong capability of anti-interference, and can provide a larger bandwidth, high throughput and high scalability.

Figure 5:
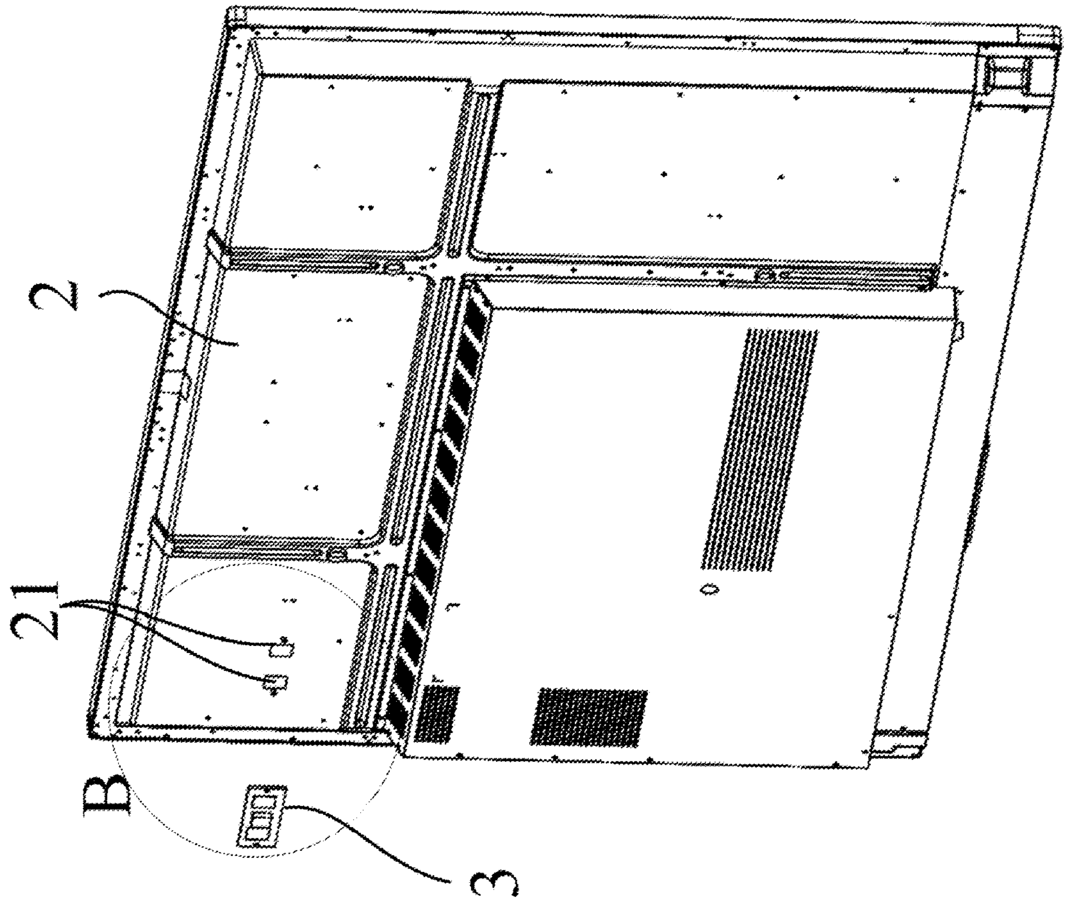
FIG. 5 is a schematic diagram of an interactive white board after an antenna assembly is disassembled according to an embodiment of the present disclosure.
Figure 6:
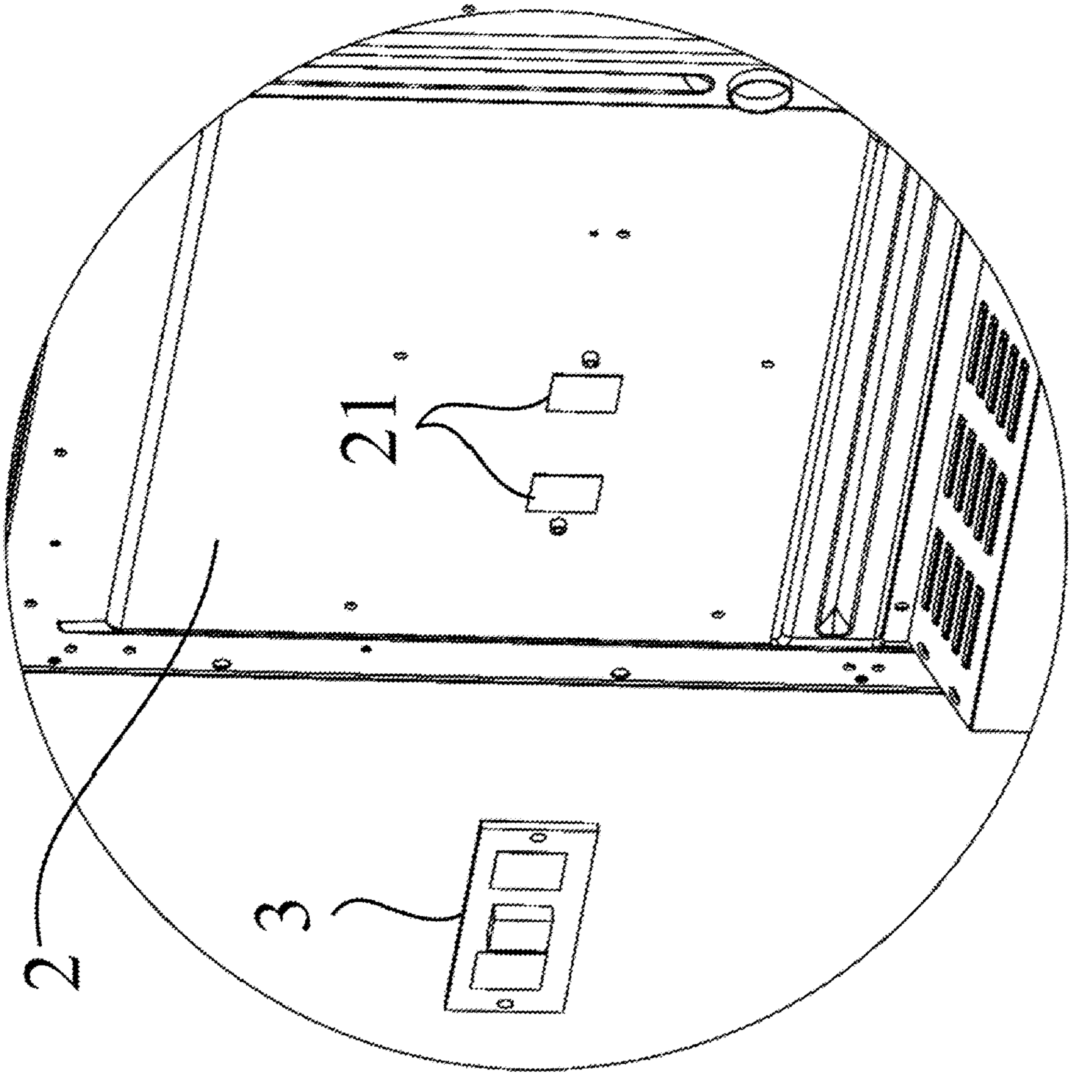
FIG. 6 is the schematic diagram of Part B in FIG. 5.

As shown in FIGS. 5 and 6, in the embodiment of the present disclosure, the metal backboard 2 is located on the back surface of the display screen 1, and the metal backboard 2 is provided with through holes 21. The antenna assembly 3 is provided on a surface of the metal backboard 2 facing away from the display screen 1, and is located in a display region of the display screen 1, and the antenna assembly 3 is disposed directly opposite to the through holes 21. It should be noted that the fact that the antenna assembly 3 being located in the display region of the display screen 1 may refer to that: the projection of the antenna assembly 3 on the display screen 1 is in the display region of the display screen 1. The through holes 21 may refer to round holes, square holes or other special-shaped holes in the metal backboard 2 penetrating the metal backboard 2, and the shape of the through holes 21 can be set according to the antenna assembly 3. The antenna assembly 3 being disposed directly opposite to the through holes 21 refers to that: antenna units on the antenna assembly 3 are directly opposite to the through holes 21, so that the wireless signal radiated by the antenna unit can pass through the through hole 21 and then penetrate the display screen 1 and radiate to the directly front of the display screen 1.

The interactive white board of embodiments of the present disclosure includes a display screen, a metal backboard, an antenna assembly, and a mainboard, wherein the metal backboard is located behind the display screen and is provided with through holes, the antenna assembly is provided on a surface of the metal backboard facing away from the display screen, and is located in the display region of the display screen, the antenna assembly is disposed directly opposite to the through holes, the mainboard is provided on the surface of the metal backboard facing away from the display screen, and the antenna assembly is electrically connected with the mainboard. In embodiments of the present disclosure, the antenna assembly is disposed in the display region of the display screen, and can radiate signals forward through the through holes on the metal backboard and the display screen, without occupying a frame region of the interactive white board, such that the frame can be made narrower, which improves a screen-to-body ratio of the interactive white board and even realizes a full-screen design.

Furthermore, the antenna assembly is located in the display region of the display screen and does not occupy a frame region of the interactive white board. Therefore, the interactive white board can use a metal frame, so that through the metal frame, the interactive white board can not only improve the structural strength, but also have a good appearance.

Furthermore, the interactive white board does not need to provide an antenna on the frame, which avoids the problem of signal attenuation caused by the antenna located in the frame being blocked by the wall due to the interactive white board being embedded in the wall. The antenna assembly in the interactive white board in this embodiment is located in the display region of the display screen, so when the interactive white board is embedded in the wall, the antenna assembly is outside a shielding range of the wall, thus the radiation capability of the antenna assembly is not affected.

Figure 7:
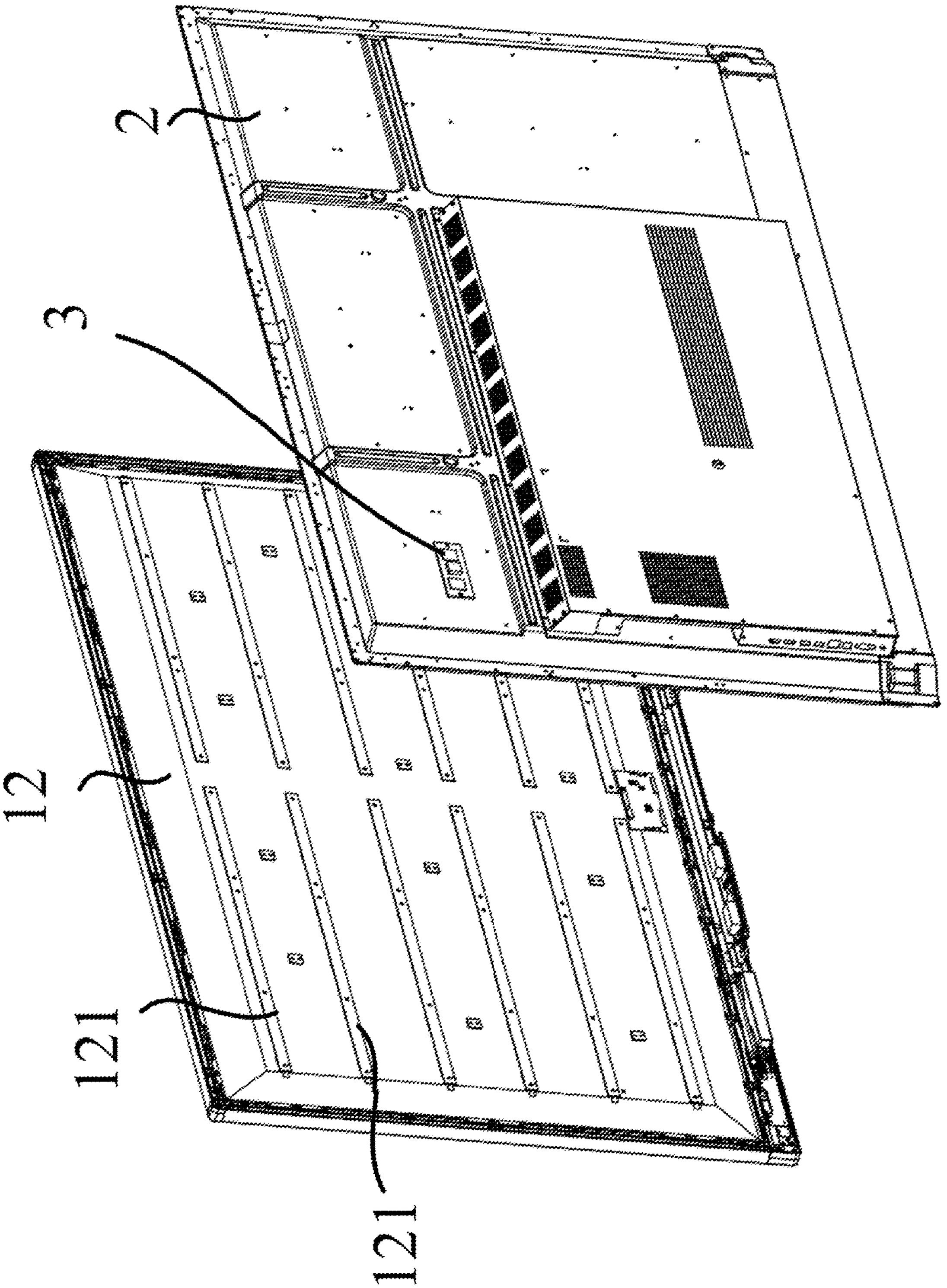
FIG. 7 is a schematic diagram of exposing a backlight layer after the metal back plate is disassembled in an embodiment of the present disclosure.
Figure 8:
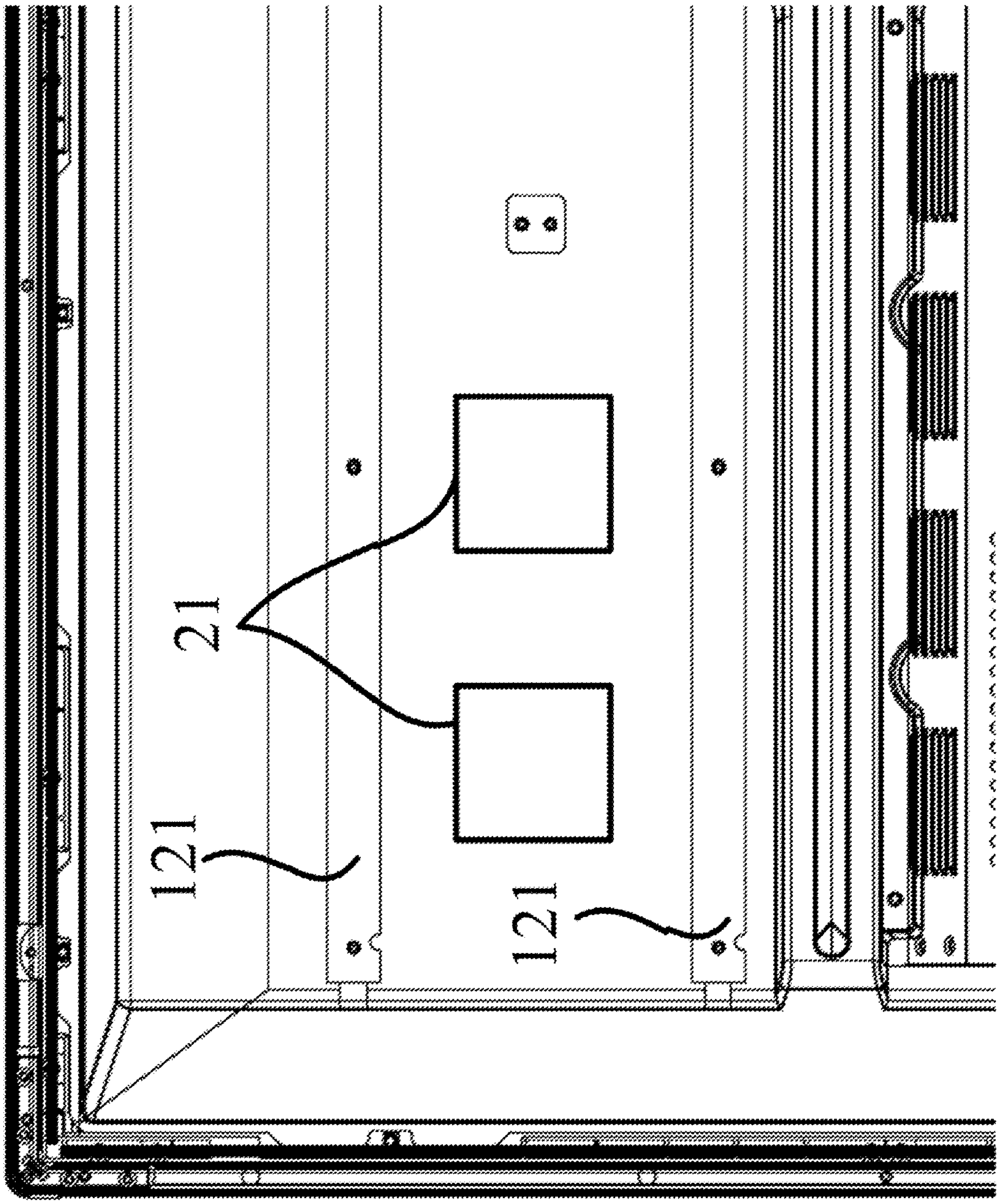
FIG. 8 is a schematic diagram of relative positions of the through holes and light bars in the embodiment of the present disclosure.

As shown in FIGS. 3, 7 and 8, the backlight layer 12 of the display screen 1 according to the embodiment of the present disclosure may include a plurality of light bars 121 arranged in a regular array, and the light bars 121 emit light after being powered on so as to provide the display layer 11 with required backlight. In one example, the light bar 121 may be a light bar composed of a plurality of Light-Emitting Diode (LED) lights, in some implementations, the light bar 121 may be composed of a plurality of light emitting diodes. As shown in FIGS. 7 and 8, in one example, the plurality of light bars 121 is arranged at intervals in a horizontal direction. In some implementations, the plurality of light bars 121 may also be arranged at intervals in a vertical direction, or arranged in a grid shape in the horizontal and vertical directions. As shown in FIG. 8, taking arrangement of the light bars 121 at intervals in the horizontal direction as an example, a projection of the through holes 21 of the metal backboard 2 in the backlight layer 12 is between the two light bars 121, so that wireless signals radiated by the antenna assembly 3 can propagate between the two light bars 121 towards the display layer 11 of the display screen 1, which can prevent the light bars 121 from interfering with the wireless signals radiated by the antenna assembly 3 and improve the anti-interference capability of the antenna assembly 3.

Figure 9:
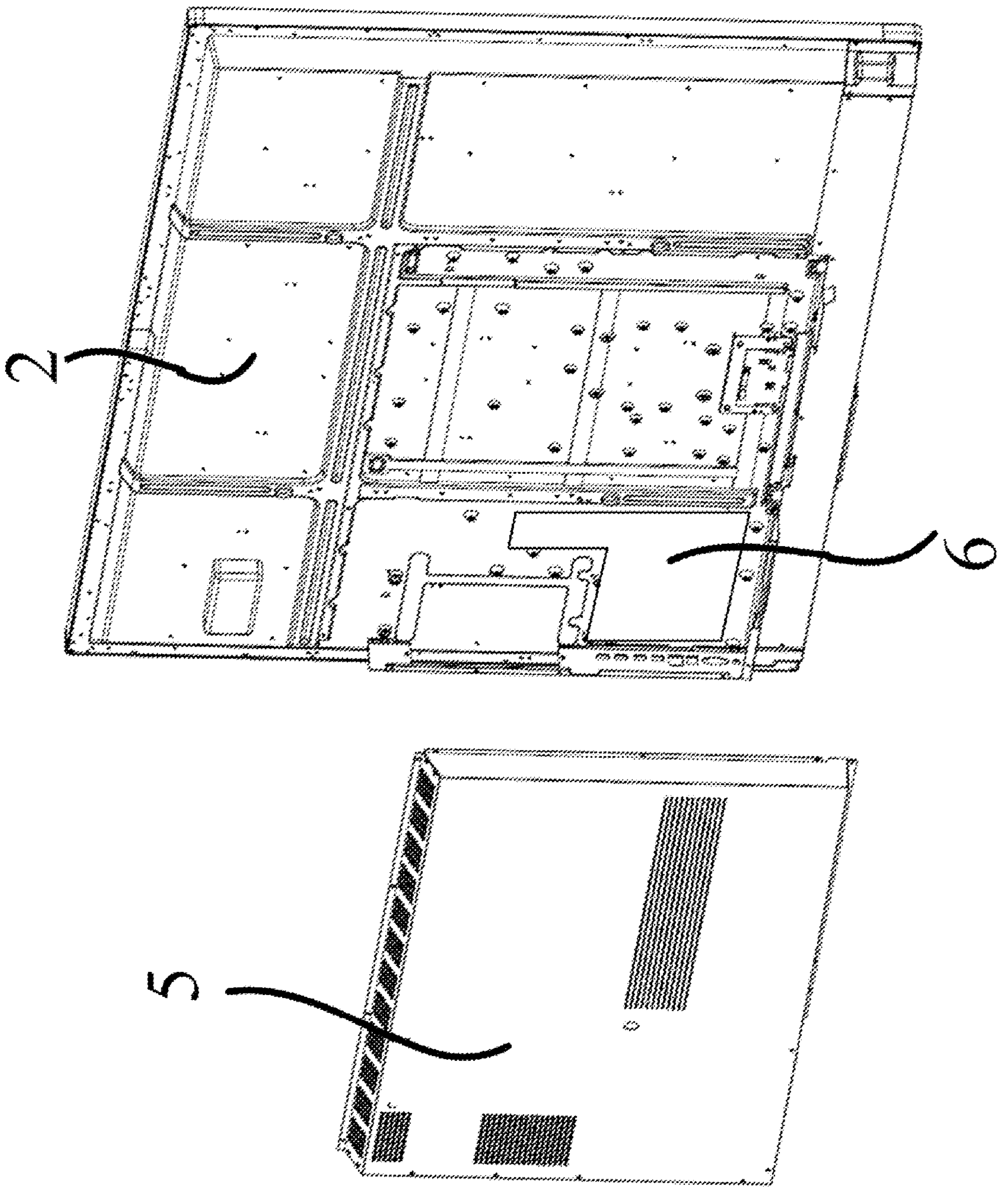
FIG. 9 is a schematic diagram of an interactive white board after a metal back cover is disassembled according to the embodiment of the present disclosure.
Figure 10:
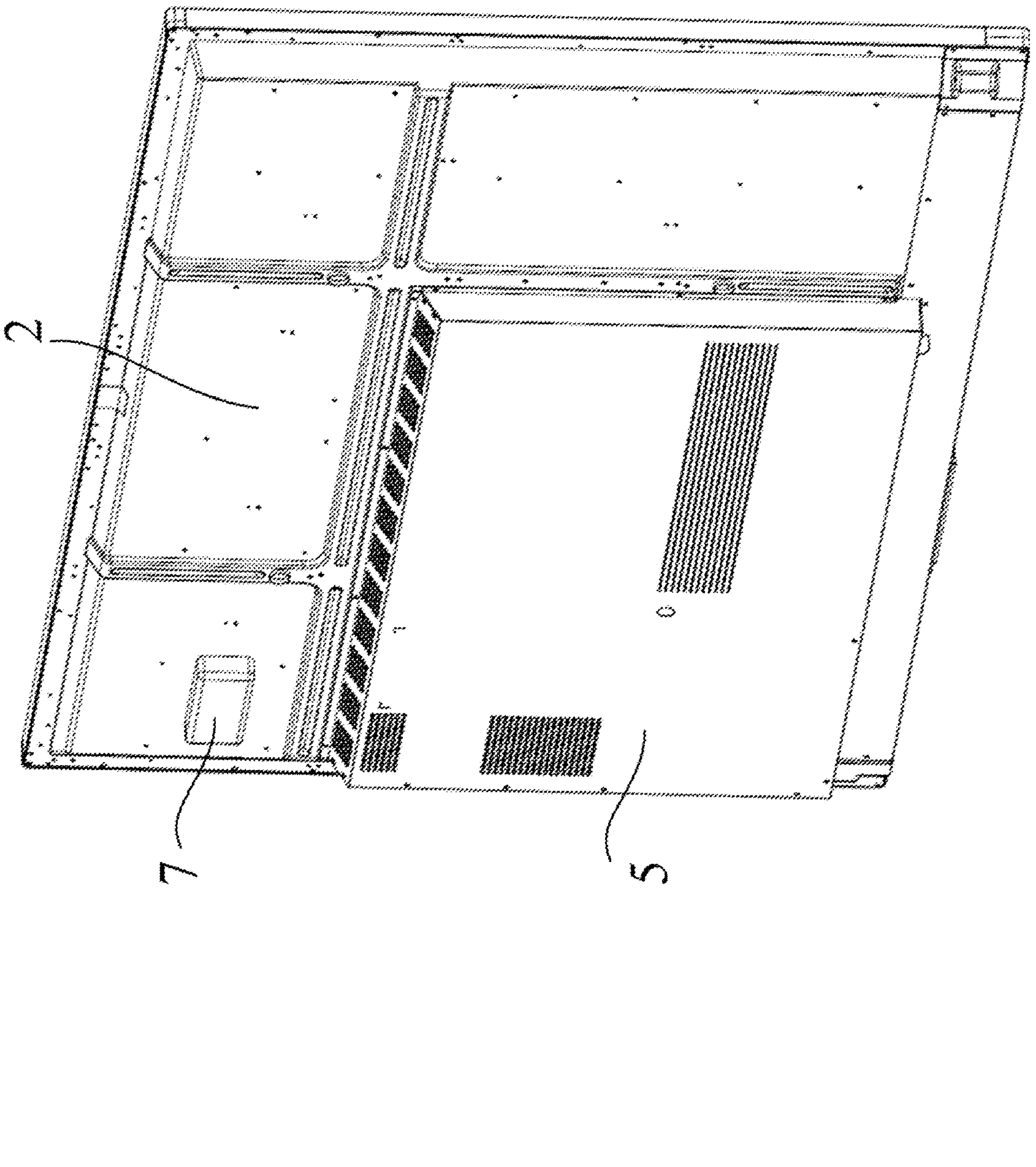
FIG. 10 is a schematic diagram of an interactive white board provided with a decorative piece in an embodiment of the present disclosure.

As shown in FIGS. 9 and 10, in an embodiment of the present disclosure, the interactive white board further includes a metal back cover 5, the mainboard 6 is disposed on a surface of the metal backboard 2 facing away from the display screen 1, and the metal back cover 5 is connected with the metal backboard 2 and covers the mainboard 6. In some implementations, the metal back cover 5 is connected with the metal backboard 2 to form an accommodating cavity, and the mainboard 6 is located in the accommodating cavity and is mechanically connected with the metal backboard 2. In one example, the mainboard 6 and the metal backboard 2 are connected by screws. On the one hand, the mainboard 6 is provided on a surface of the metal backboard 2 facing away from the display screen 1, and the mainboard 6 and the display screen 1 are isolated by the metal backboard 2, which can prevent the mainboard 6 and the display screen 1 from interfering with each other. On the other hand, the metal back cover 5 covers the mainboard 6, which can not only protect the mainboard 6 from physical impact, dust and water, but also prevent the mainboard 6 from being subjected to electromagnetic interference.

Figure 11:
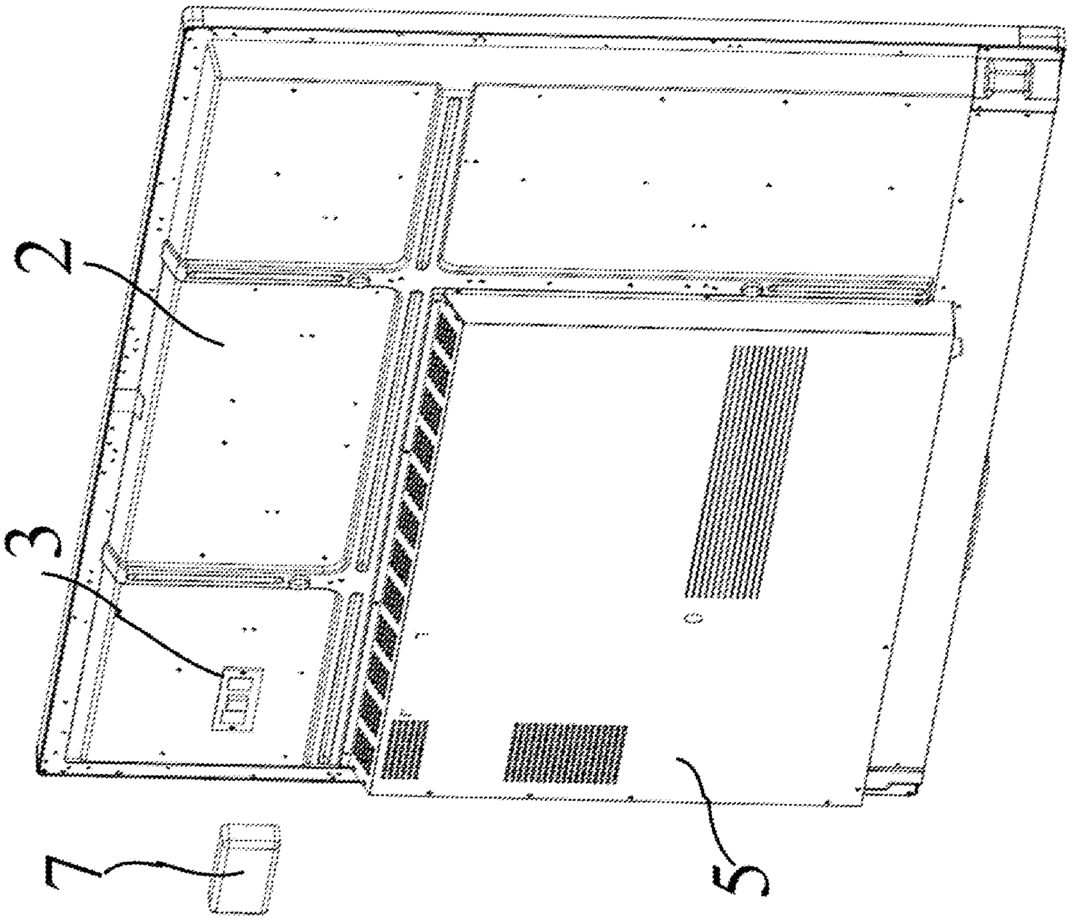
FIG. 11 is a schematic diagram of an interactive white board after the decorative piece is disassembled according to an embodiment of the present disclosure.

As shown in FIGS. 10 and 11, in an embodiment, when the interactive white board is provided with the metal back cover 5, the antenna assembly 3 is located outside a region covered by the metal back cover 5. It should be noted that the antenna assembly 3 may be located at any position outside the region covered by the metal back cover 5, and the position of the antenna assembly 3 on the metal backboard 2 is not limited in the embodiment of the present disclosure. The antenna assembly 3 is disposed outside the region covered by the metal back cover 5, and the motherboard 6 and the antenna assembly 3 are isolated by the metal back cover 5, which can avoid mutual electromagnetic interference between the motherboard 6 and the antenna assembly 3. Therefore, the antenna assembly 3 has good anti-interference capability, the radiation performance of the antenna assembly 3 is improved.

As shown in FIGS. 10 and 11, when the antenna assembly 3 is disposed outside the region covered by the metal back cover 5, the interactive white board may further include a decorative piece 7, and the decorative piece 7 is connected with the metal backboard 2 and covers the antenna assembly 3. In one example, the decorative piece 7 can be detachably connected with the metal backboard 2, for example, the decorative piece 7 can be mechanically connected with the metal backboard 2 by means of snaps, screws, etc., so as to cover the antenna assembly 3, which can avoid affecting the overall appearance of the interactive white board due to the exposure of the antenna assembly 3, and can also play a role of protecting the antenna assembly 3 from physical impact, preventing dust and water, etc.

In an embodiment, the material of the decorative piece 7 can be metal, for example, the material of the decorative piece 7 can be aluminum, copper, iron, etc., so that the decorative piece 7 made of metal can be used as a shielding cover to prevent the antenna assembly 3 from electromagnetic interference in the direction behind the metal backboard 2, and improve the anti-interference performance of the antenna assembly 3.

In some implementations, the material of the decorative piece 7 can also be a non-metallic material. In an embodiment, a region beyond the region covered by the antenna assembly 3 on the metal backboard 2 is provided with a spray-painting layer. In some implementations, the exposed surface of the decorative piece 7 is further provided with a spray-painting layer with the same color. On the one hand, since the material of the metal backboard 2 is metal, the arrangement of the spray-painting layer can prevent the metal backboard 2 from being rusted due to chemical reactions such as oxidation. On the other hand, metal exposure can be avoided by the spray-painting layer, and the interactive white board has a good appearance.

Figure 2:
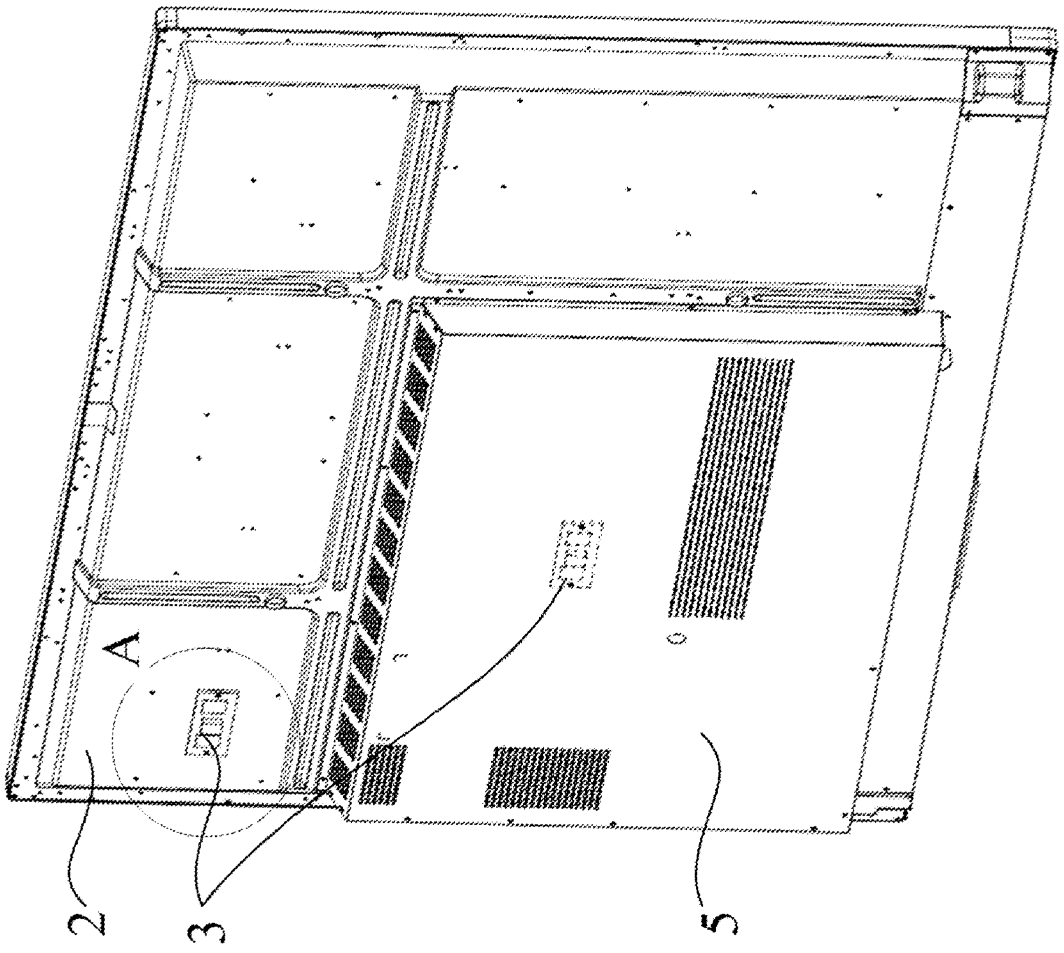
FIG. 2 is a schematic diagram of a position of an antenna assembly of an interactive white board according to an embodiment of the present disclosure.

As shown in FIG. 2, in an embodiment of the present disclosure, the antenna assembly 3 may also be located in the region covered by the metal back cover 5. In some implementations, an accommodation cavity is formed between the metal back cover 5 and the metal backboard 2, the antenna assembly 3 is disposed in the accommodating cavity and is connected with the metal backboard 2. And the position of the metal backboard 2 directly opposite to the antenna assembly 3 is also provided with through holes, which is the same as that the antenna assembly 3 is disposed outside the region covered by the metal back cover 5. In the embodiment of the present disclosure, the antenna assembly 3 is disposed in the region covered by the metal back cover 5, and the antenna assembly 3 does not expose outside an outer surface of the interactive white board, which does not need additional decorative piece 7 to cover the exposed antenna assembly 3.

As shown in FIG. 2, in the interactive white board of this embodiment of the present disclosure, the number of antenna assemblies 3 may be two or more, for example, may include a first antenna assembly and a second antenna assembly, wherein the first antenna assembly is located in the region covered by the metal back cover 5, and the second antenna assembly is located outside the region covered by the metal back cover 5. Exemplarily, the first antenna assembly may be an Access Point (AP) antenna assembly, and the second antenna assembly may be a Wi-Fi antenna assembly. Therein, the AP antenna assembly is a wireless switch used in wireless network, and is also the core of the wireless network. The wireless AP is an access point for the interactive white board to enter the wired network, mainly used in broadband homes, inside buildings and inside the campus. And wireless APs can cover a radiation range of tens of meters to hundreds of meters. In the interactive white board, the AP antenna assembly is mainly used to communicate with wireless devices such as a screen transmitter that is in front of the interactive white board, and may just have the function of forward radiation.

In this embodiment of the present disclosure, the first antenna assembly is disposed in the region covered by the metal back cover 5, and the second antenna assembly is disposed outside the region covered by the metal back cover 5. The two antenna assemblies are isolated by metal back cover 5, so the isolation of the two antenna assembly is good, and the wireless signals do not interfere with each other.

In some implementations, the two antenna assemblies 3 can also be disposed outside the region covered by the metal back cover 5, or the two antenna assemblies 3 can be arranged in the region covered by the metal back cover 5. There is no limitation on whether the antenna assembly 3 is disposed in the metal back cover 5 or outside the metal back cover 5.

Thereinafter, the connection mode of the antenna assembly 3 and the metal backboard 2 is exemplified with reference to the accompanying drawings.

Figure 12:
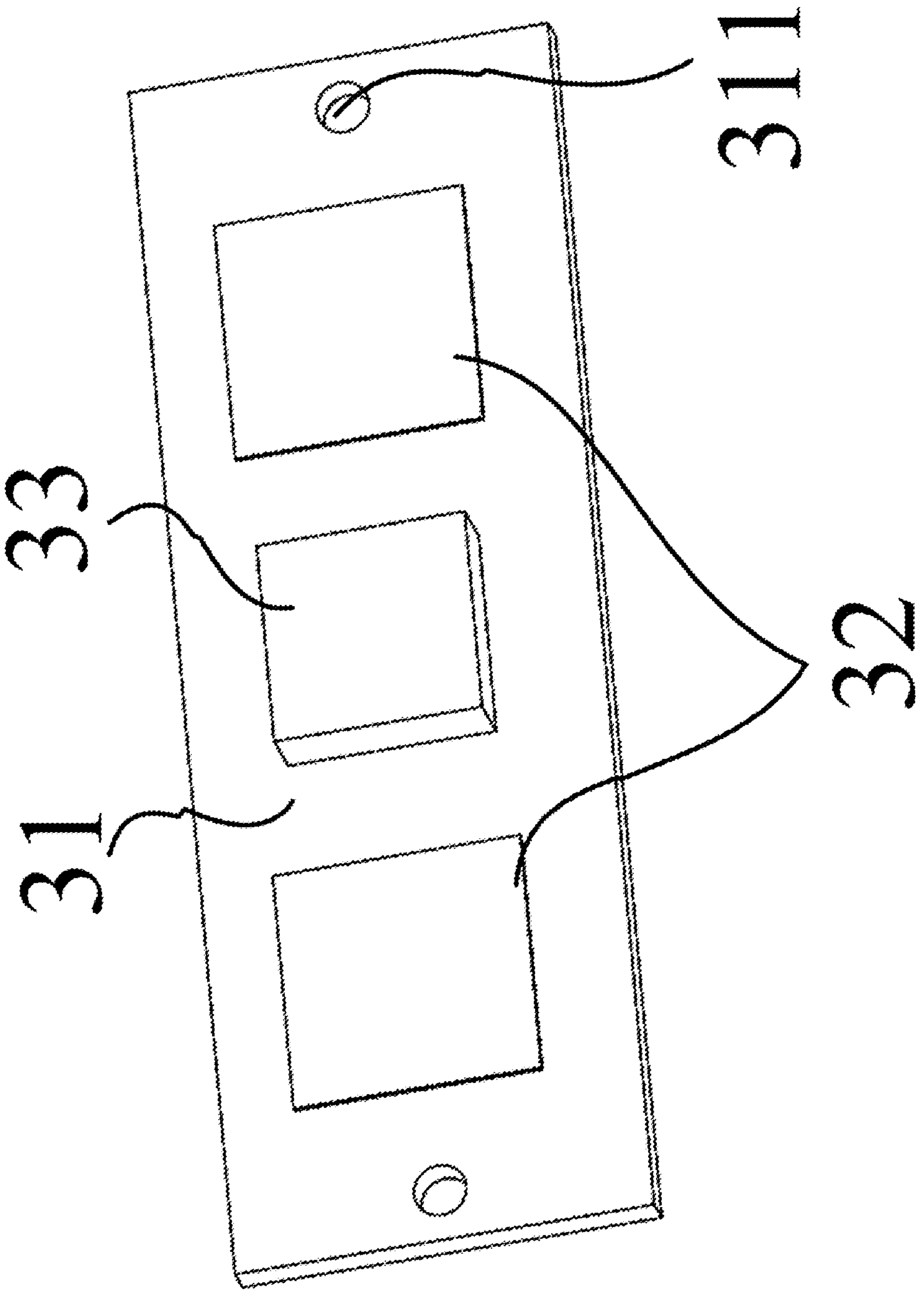
FIG. 12 is a schematic diagram of an antenna assembly according to an embodiment of the present disclosure.

In an example of the present disclosure, as shown in FIG. 12, the antenna assembly 3 includes a dielectric substrate 31 and antenna units 32 disposed on the dielectric substrate 31. The antenna assembly 3 is connected with the metal backboard 2 through the dielectric substrate 31, and the antenna units 32 are arranged directly opposite to the through holes 21. In some implementations, the dielectric substrate 31 may be a Printed Circuit Board (PCB) substrate or other substrates, and the dielectric substrate 31 and the metal backboard 2 are detachably connected. For example, the dielectric substrate 31 and the metal backboard 2 can be mechanically connected by means of snap fitting, screw locking, etc., or bonded by double-sided tape. The antenna assembly 3 in the embodiment of the present disclosure is detachably connected with the metal backboard 2, which can facilitate disassembly of the antenna assembly 3, and facilitate maintenance and replacement of the antenna assembly 3 of the interactive white board.

Figure 13:
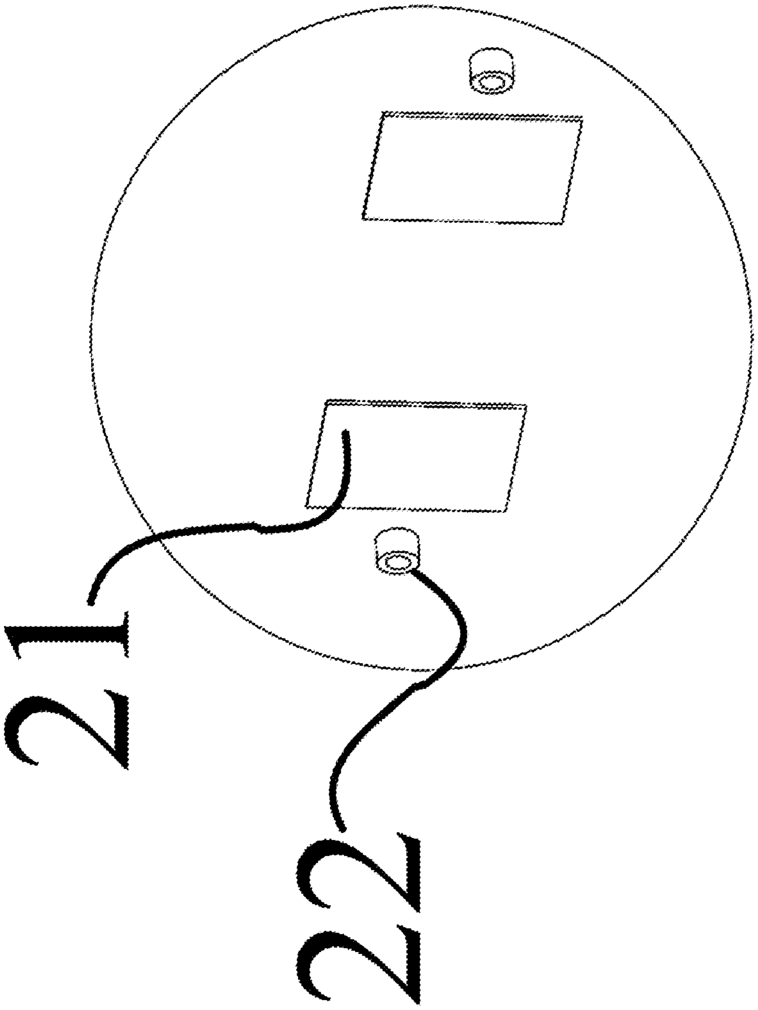
FIG. 13 is a schematic diagram of through holes and extruded holes of the metal backboard in the embodiment of the present disclosure.

As shown in FIGS. 12 and 13, in an example of the present disclosure, the dielectric substrate 31 is provided with lock holes 311. The metal backboard 2 is provided with extruded holes 22 matching with the lock holes 311. The extruded hole 22 is provided with internal threads. The extruded hole 22 is inserted into the lock holes 311 so as to connect the dielectric substrate 31 and the metal backboard 2 by screws. In some implementations, the extruded hole 22 can be a cylindrical structure with a certain height formed on the metal backboard 2 by a stamping process, and threads can be formed by tapping inside the cylindrical structure. For example, the height of the extruded hole 22 is generally less than the thickness of the dielectric substrate 31, so that after the screw is locked into the lock hole, a nut of the screw can press against the dielectric substrate 31 so as to fix the dielectric substrate 31 on the metal backboard 2. In the embodiment of the present disclosure, by providing the extruded hole 22 on the metal backboard 2 to mechanically connect with the dielectric substrate 31, and inserting the extruded hole 22 into the lock hole 311 of the dielectric substrate 31, the dielectric substrate 31 can be easily positioned, and thus the antenna assembly 3 can be quickly assembled on the interactive white board.

Furthermore, a conductor is further provided between the dielectric substrate 31 and the metal backboard 2. In some implementations, the conductor may be an elastic conductor, such as one of conductive foam, conductive cloth, conductive paint, and metal dome. Taking the conductive foam as an example, a conductive foam can be provided between the dielectric substrate 31 and the metal backboard 2, and the conductive foam is around the dielectric substrate 31 so as to improve electrical connection performance between the metal backboard 2 and exposed copper surrounding a surface of the dielectric substrate 31 facing the metal backboard 2, which makes the antenna assembly 3 have good grounding performance and anti-interference performance.

Figure 14:
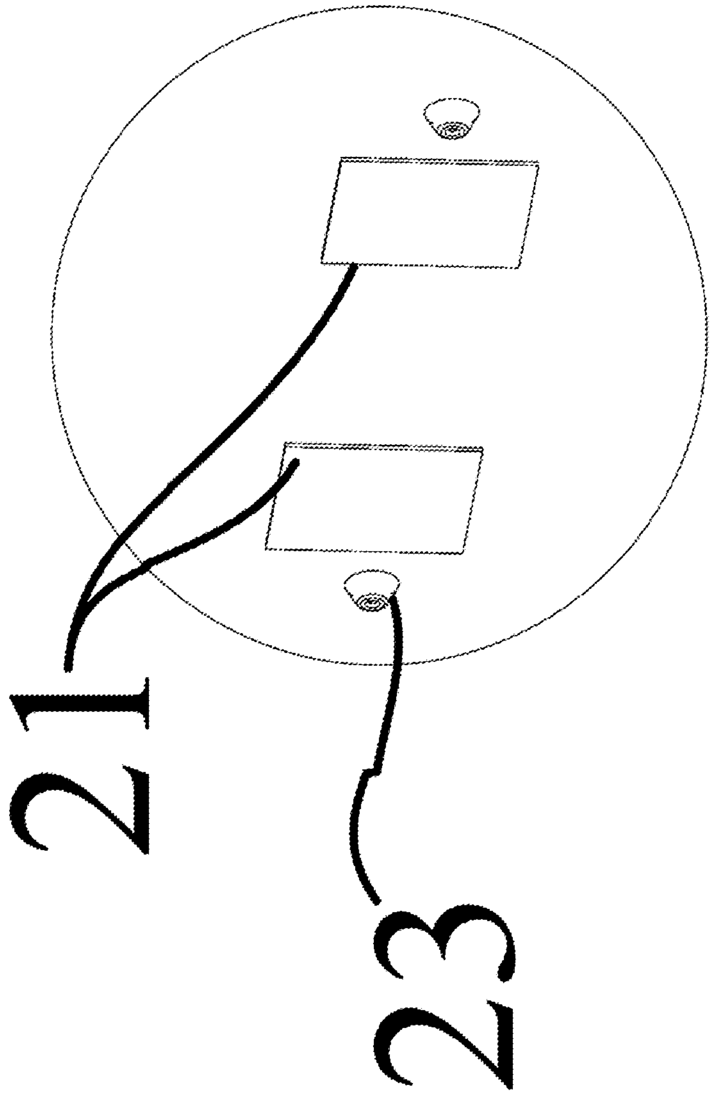
FIG. 14 is a schematic diagram of a bulge of a metal backboard in an embodiment of the present disclosure.

As shown in FIGS. 12 and 14, in another example of the present disclosure, a plurality of bulges 23 are provided on a surface of the metal backboard 2 facing away from the display screen 1. The bulges 23 are provided with internal threads, the dielectric substrate 31 is located on the bulge 23, and the dielectric substrate 31 and the bulge 23 are connected by screws, so as to realize the detachable connection between the antenna assembly 3 and the metal backboard 2. Furthermore, a conductor is disposed between the dielectric substrate 31 and the metal backboard 2, and the conductor is around the dielectric substrate 31. The bulge 23 in the embodiment of the present disclosure has a certain height, thus when the dielectric substrate 31 is disposed on the bulge

23, there is a certain distance between the dielectric substrate 31 and the metal backboard 2, so that the surface of the dielectric substrate 31 facing the metal backboard 2 can be provided with electronic components.

In order to improve the anti-interference capability of the antenna assembly 3, in the embodiments of the present disclosure, the shielding structure of the antenna assembly 3 will be described with reference to the accompanying drawings.

Figure 16:
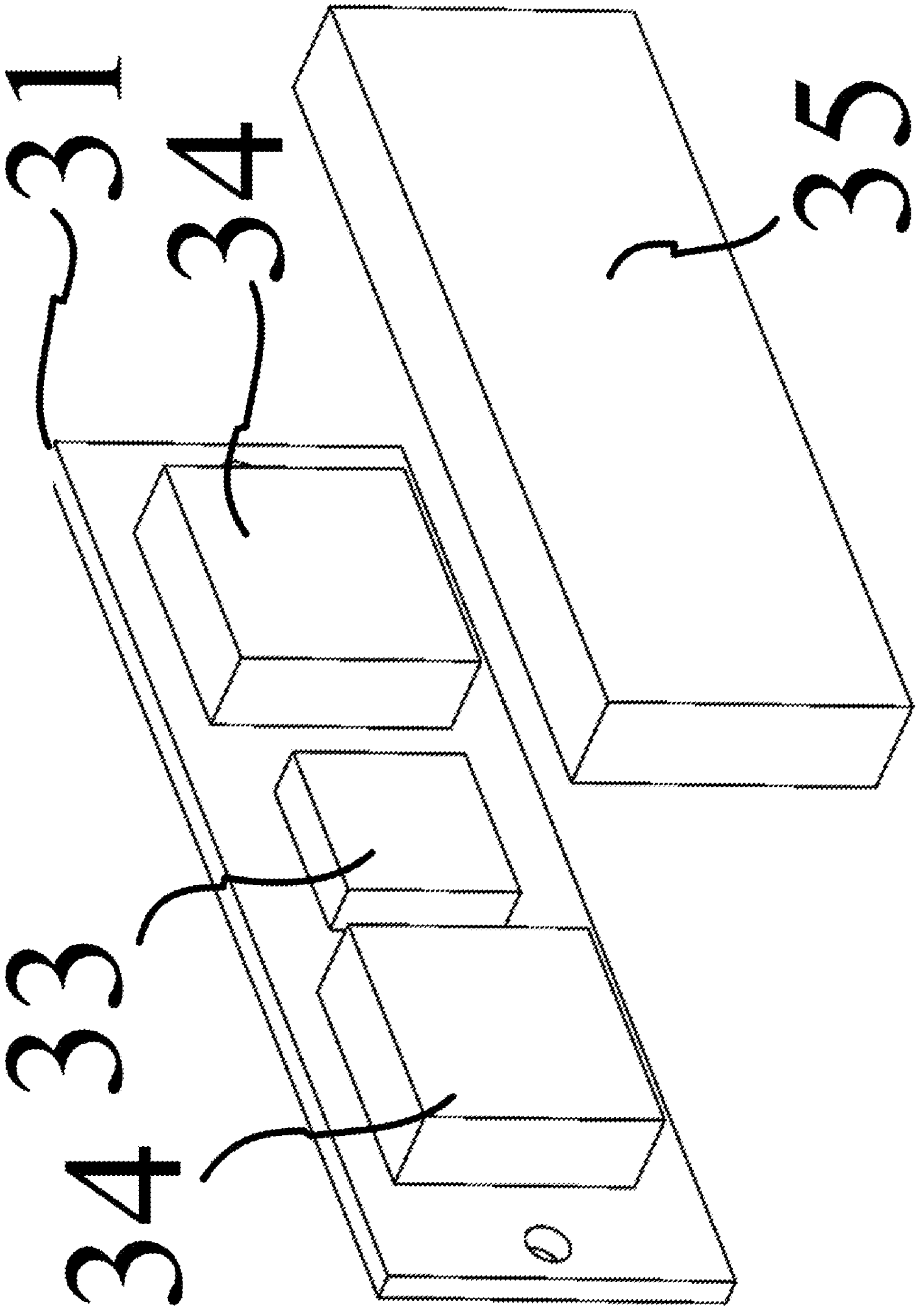

As shown in FIG. 16, in one example, the antenna assembly 3 further includes a first metal shielding cover 35. The first metal shielding cover 35 covers the dielectric substrate 31. In some implementations, the first metal shielding cover 35 may be mechanically and electrically connected with the dielectric substrate 31. For example, the first metal shielding cover 35 and the dielectric substrate 31 are mechanically and electrically connected by means of soldering, metal clips, etc. The first metal shielding cover 35 can protect the entire antenna assembly 3 from electromagnetic interference, which improves the anti-interference capability of the antenna assembly 3.

In one example, when the antenna assembly 3 is disposed in the region covered by the metal back cover 5, a first metal shielding cover 35 needs to be added to the antenna assembly 3, so as to avoid electromagnetic interference caused by the mainboard 6 in the metal back cover 5 to the antenna assembly 3.

In another example, when the antenna assembly 3 is disposed outside the region covered by the metal back cover 5, since the mainboard 6 and the antenna assembly 3 have been isolated by the metal back cover 5, the first metal shield 35 may not be added to the antenna assembly 3. Or, a metal decorative piece 7 may be used as the shielding cover.

Figure 15:
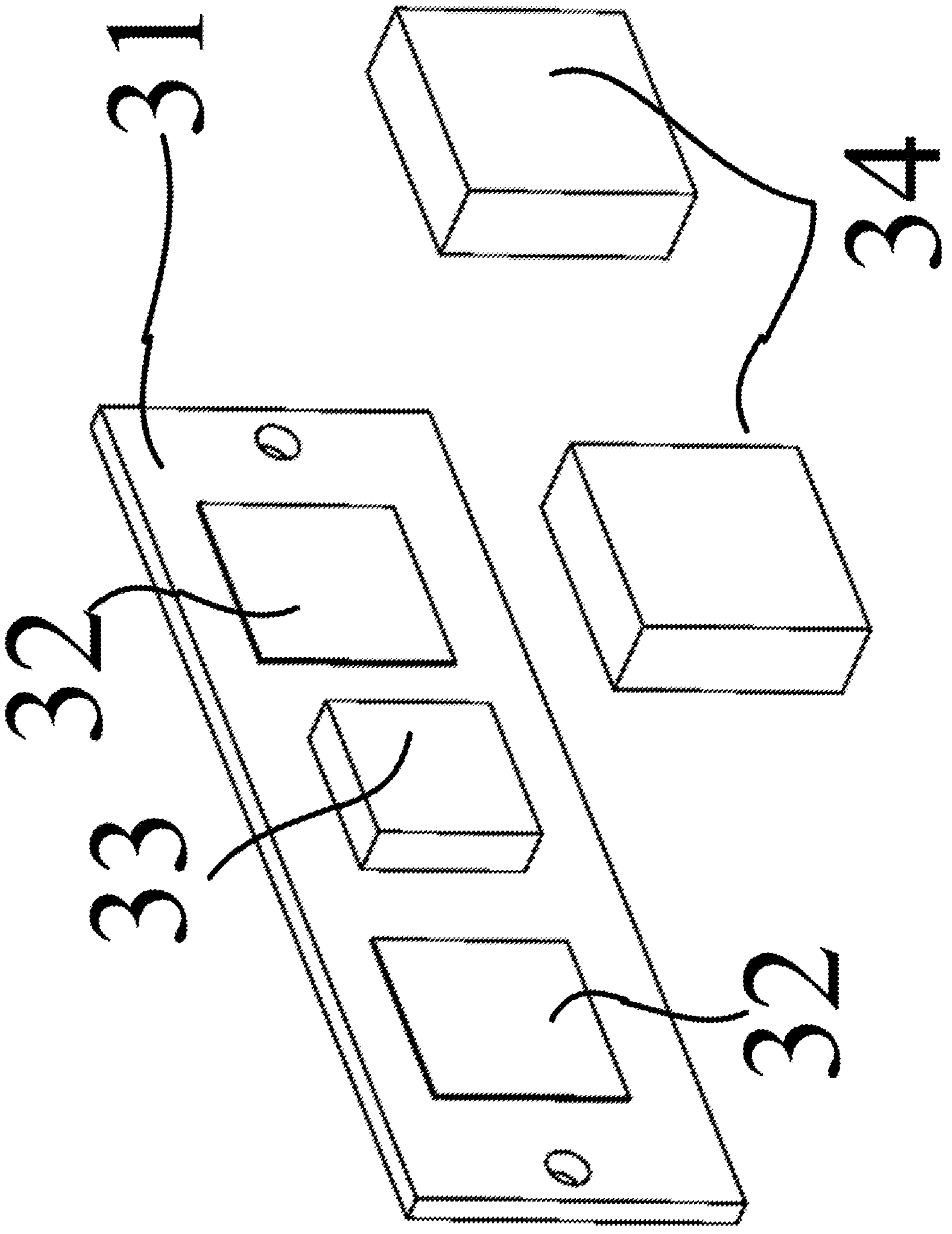
FIGS. 15-16 are schematic diagrams of a shielding cover of the antenna assembly in the embodiment of the present disclosure.

As shown in FIGS. 15 and 16, in an embodiment of the present disclosure, the number of antenna units 32 on the antenna assembly 3 is two or more. The antenna assembly 3 may further include a second metal shielding cover 34. Each of the antenna units 32 is covered by a second metal shielding cover 34, that is, each antenna unit 32 is provided with a second metal shielding cover 34, so that the isolation among the antenna units 32 and the overall radiation performance of the antenna assembly 3 can be improved. In some implementations, a distance from the antenna unit 32 to the bottom of the second metal shield 34 is an integer multiple of a quarter wavelength of the electromagnetic wave radiated by the antenna unit 32, so that the forward radiation capability of the antenna unit 32 can be improved, which increases the radiation distance of the antenna unit 32.

FIG. 15 is a schematic diagram of antenna units of the antenna assembly 3 according to an embodiment of the present disclosure. In an embodiment of the present disclosure, a radio frequency chip 33 is further provided on the dielectric substrate 31 of the antenna assembly 3. The antenna unit 32 is electrically connected with the radio frequency chip 33 through a signal transmission line on the dielectric substrate 31. In an embodiment, the radio frequency chip 33 and the antenna unit 32 are located on the same surface of the dielectric substrate 31, so that the overall thickness of the antenna assembly 3 is smaller. In another embodiment, the radio frequency chip 33 and the antenna unit 32 are located on different surfaces of the dielectric substrate 31, so that two sides of the dielectric substrate 31 can be fully utilized and then the overall area of the dielectric substrate can be reduced.

Figure 17:
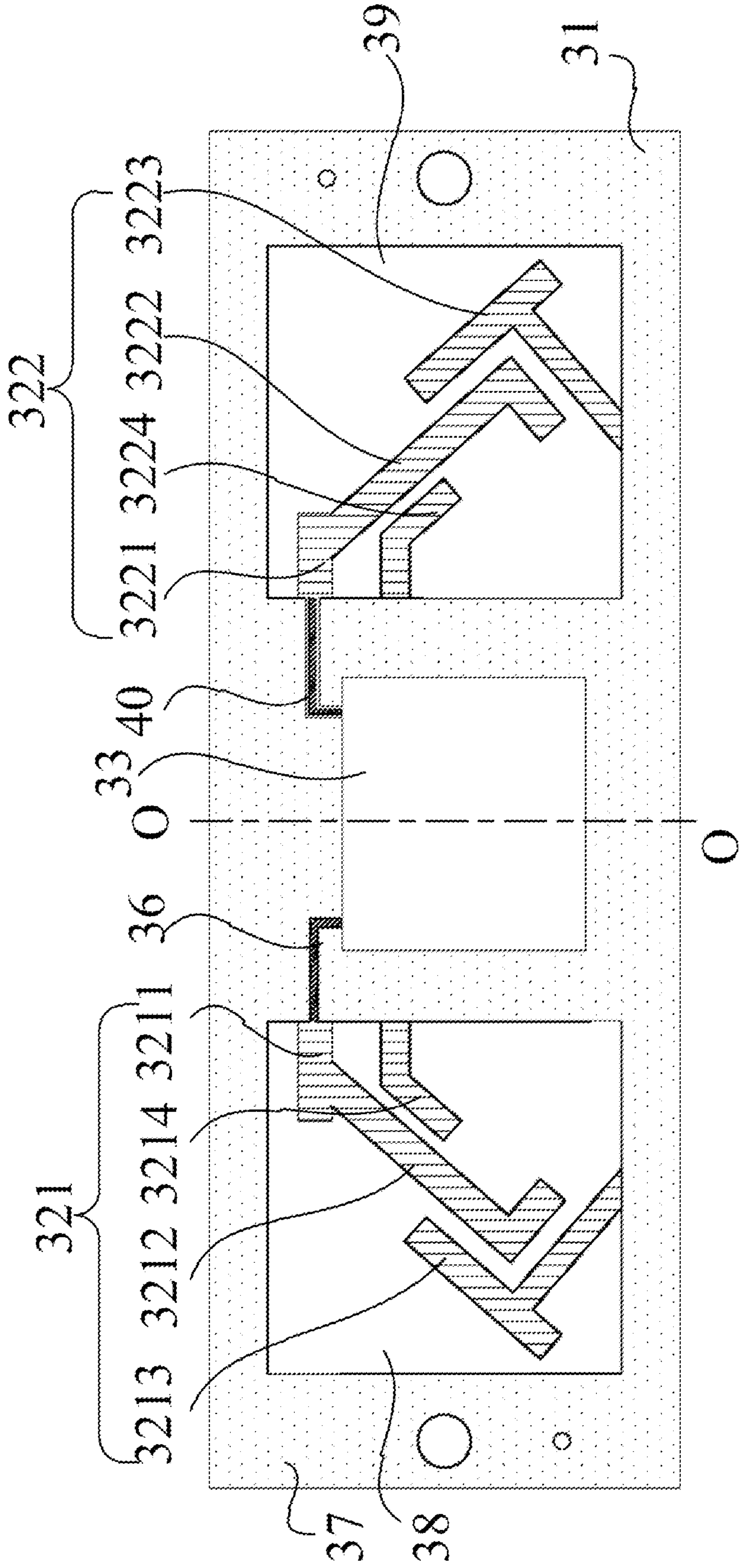
FIGS. 17-22 are schematic diagrams of antenna units of an antenna assembly in an embodiment of the present disclosure.

As shown in FIG. 17, the antenna assembly 3 in this embodiment of the present disclosure may include a first antenna unit 321 and a second antenna unit 322. The first antenna unit 321 and the second antenna unit 322 are located on two sides of the radio frequency chip 33 respectively, and are electrically connected with the radio frequency chip through the first signal transmission line 36 and the second signal transmission line 40 respectively. Disposing the first antenna unit 321 and the second antenna unit 322 on two sides of the radio frequency chip 33 can increase the distance between the first antenna unit 321 and the second antenna unit 322, and increase the isolation between the first antenna unit 321 and the second antenna unit 322.

As shown in FIG. 17, the dielectric substrate 31 is provided with a first square clearance region 38 and a second square clearance region 39 on two sides of the radio frequency chip 33 and on a surface covered with copper 37. The first antenna unit 321 is located in the square clearance region 38, and the second antenna unit 322 is located in the second square clearance region 39.

Figure 18:
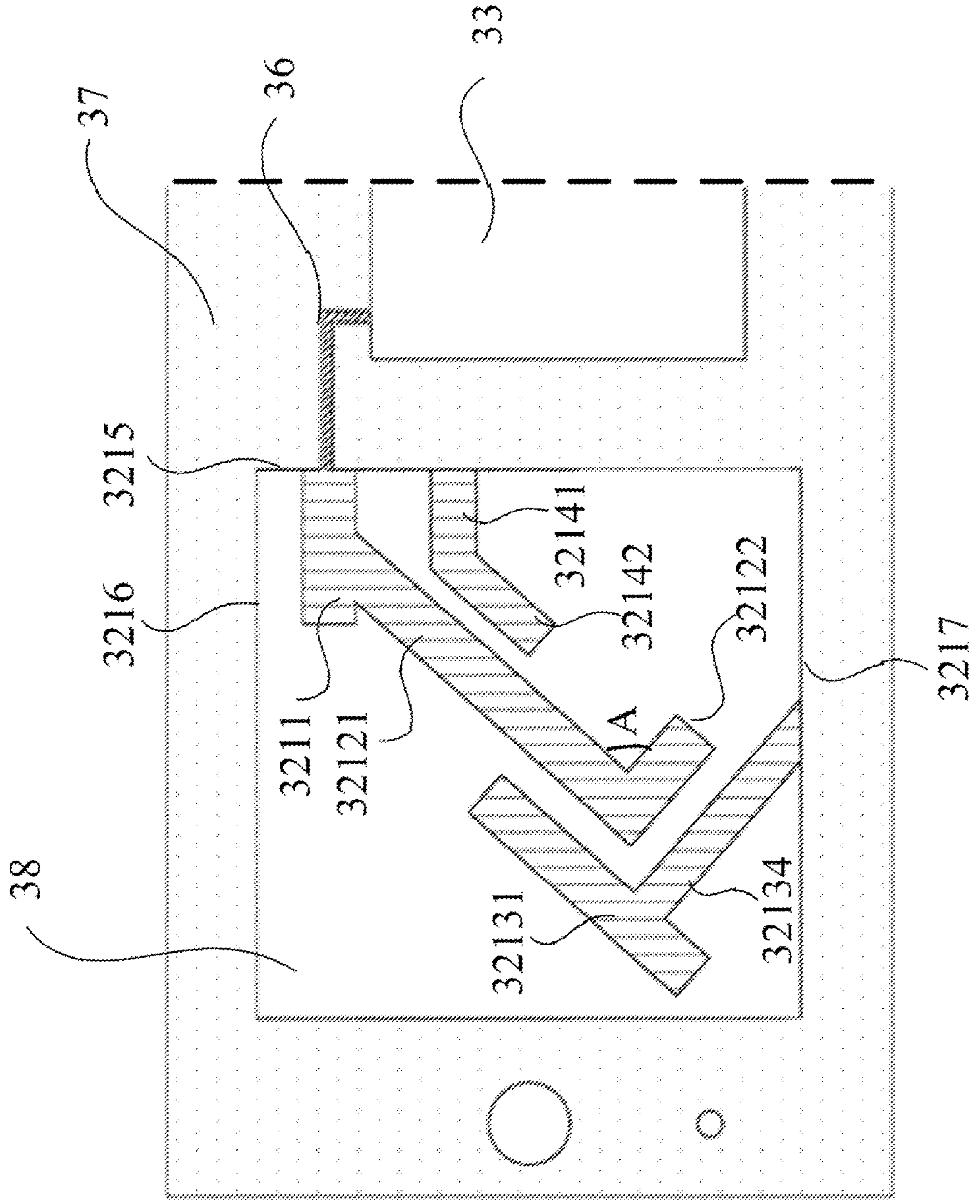

As shown in FIGS. 17 and 18, the first antenna unit 321 includes a first feeder stub 3211, a first L-shaped stub 3212, a first T-shaped stub 3213, and a first ground stub 3214.

Therein, the first feeder stub 3211 extends from a first boundary 3215 into the first square clearance region 38 and is perpendicular to the first boundary 3215. A junction between the first feeder stub 3211 and the first boundary 3215 is connected with a first signal transmission line 36. The first boundary 3215 is an upright boundary close to the radio frequency chip 33.

The first L-shaped stub 3212, the first T-shaped stub 3213 and the first ground stub 3214 are located on a side of the first feeder stub 3211 away from a second boundary 3216. The second boundary 3216 is a boundary adjacent to and perpendicular to the first boundary 3215. The first L-shaped stub 3212 includes a first stub 32121 and a second stub 32122, the first stub 32121 is connected with the first feeder stub 3211, and a connection point is located between two ends of the first feeder stub 3211. The first stub 32121 and the first feeder stub 3211 form an obtuse angle, and a first right angle A formed by the first stub 32121 and the second stub 32122 faces the first boundary 3215.

The first T-shaped stub 3213 includes a third stub 32131 and a fourth stub 32132. The third stub 32131 is located on a side of the first stub 32121 away from the first boundary 3215, and is arranged parallel to and spaced apart from the first stub 32121. The fourth stub 32132 is located on the side of the second stub 32122 away from the first feeder stub 3211, and is arranged parallel to and spaced apart from the second stub 32122. The fourth stub 32132 extends to a third boundary 3217 so as to connect the surface covered with copper 37, and the third boundary 3217 is a boundary parallel to the second boundary 3216.

The first ground stub 3214 includes a fifth stub 32141 and a sixth stub 32142. The fifth stub 32141 extends from the first boundary 3215 into the first square clearance region 38 and is parallel to the first feeder stub 3211. The sixth stub 32142 is arranged parallel to and spaced apart from the first stub 32121.

Figure 19:
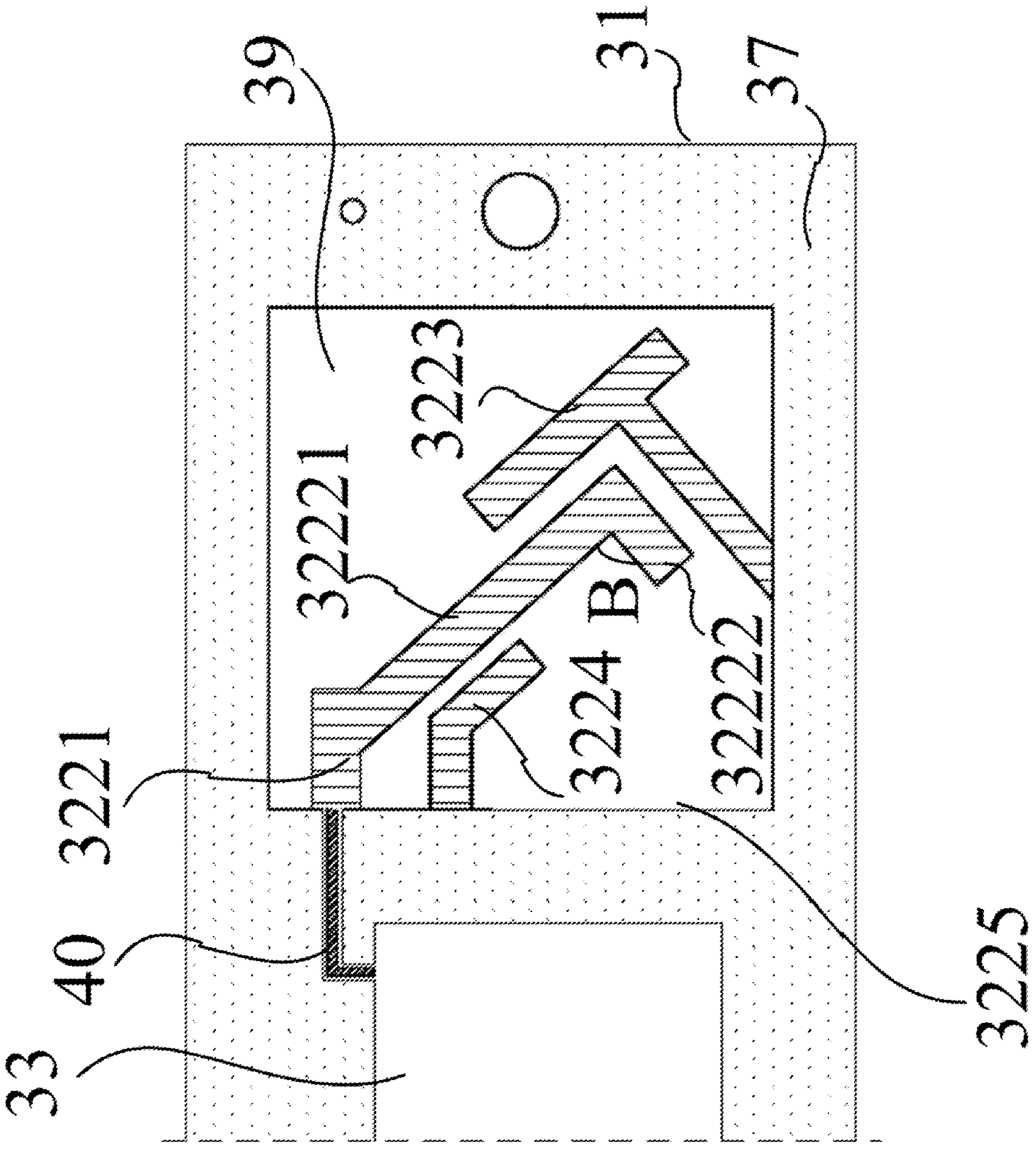

As shown in FIGS. 17 and 19, the second antenna unit 322 includes a second feeder stub 3221, a second L-shaped stub 3222, a second T-shaped stub 3223, and a second ground stub 3224.

Therein, the second feeder stub 3221 and the first feeder stub 3211 are arranged in a mirror image relative to a center line O-O of the radio frequency chip 33, and the second feeder stub 3221 is connected with the second signal transmission line 40. The second T-shaped stub 3223 and the first T-shaped stub 3213 are arranged in a mirror image relative to the center line O-O of the radio frequency chip 33, and the second ground stub 3224 and the first ground stub 3214 are arranged in a mirror image relative to the center line O-O of the radio frequency chip 33.

The second L-shaped stub 3222 includes a seventh stub 32221 and an eighth stub 32222. The seventh stub 32221 is connected with the second feeder stub 3221, and a connection point is located at one end of the second feeder stub 3221 away from a fourth boundary 3225. The seventh stub 32221 and the second feeder stub 3221 form an obtuse angle, and a second right angle B formed by the seventh stub 32221 and the eighth stub 32222 faces the fourth boundary 3225. The fourth boundary 3225 is an upright boundary of the radio frequency chip 33 close to the second square clearance region 39.

Figure 20:
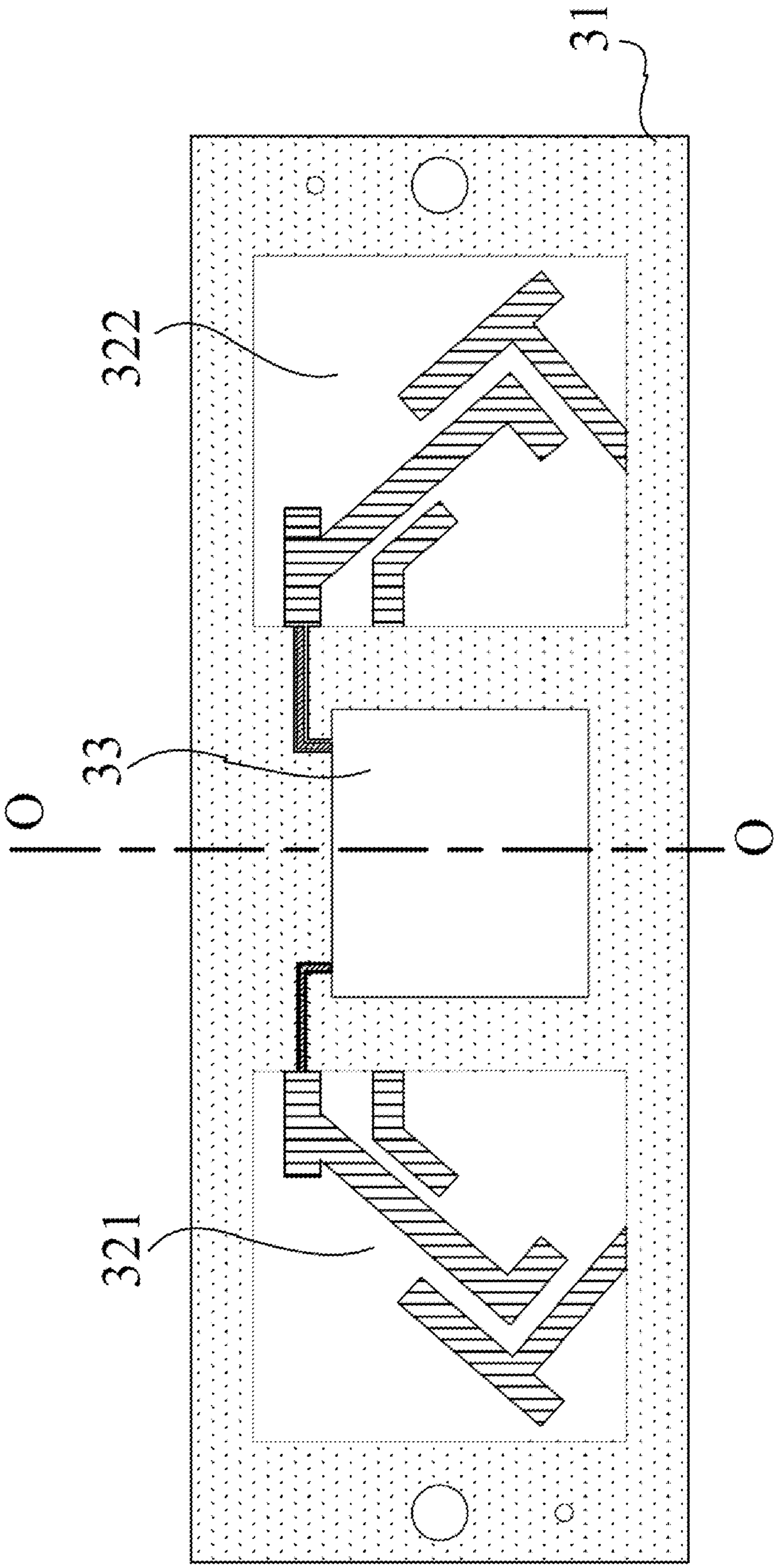

As shown in FIG. 20, in another embodiment of the present disclosure, the structure of the second antenna unit 322 may be the same as that of the first antenna unit 321, and the first antenna unit 321 and the second antenna unit 322 are arranged in a mirror image relative to the center line O-O of the radio frequency the chip 33.

Figure 21:
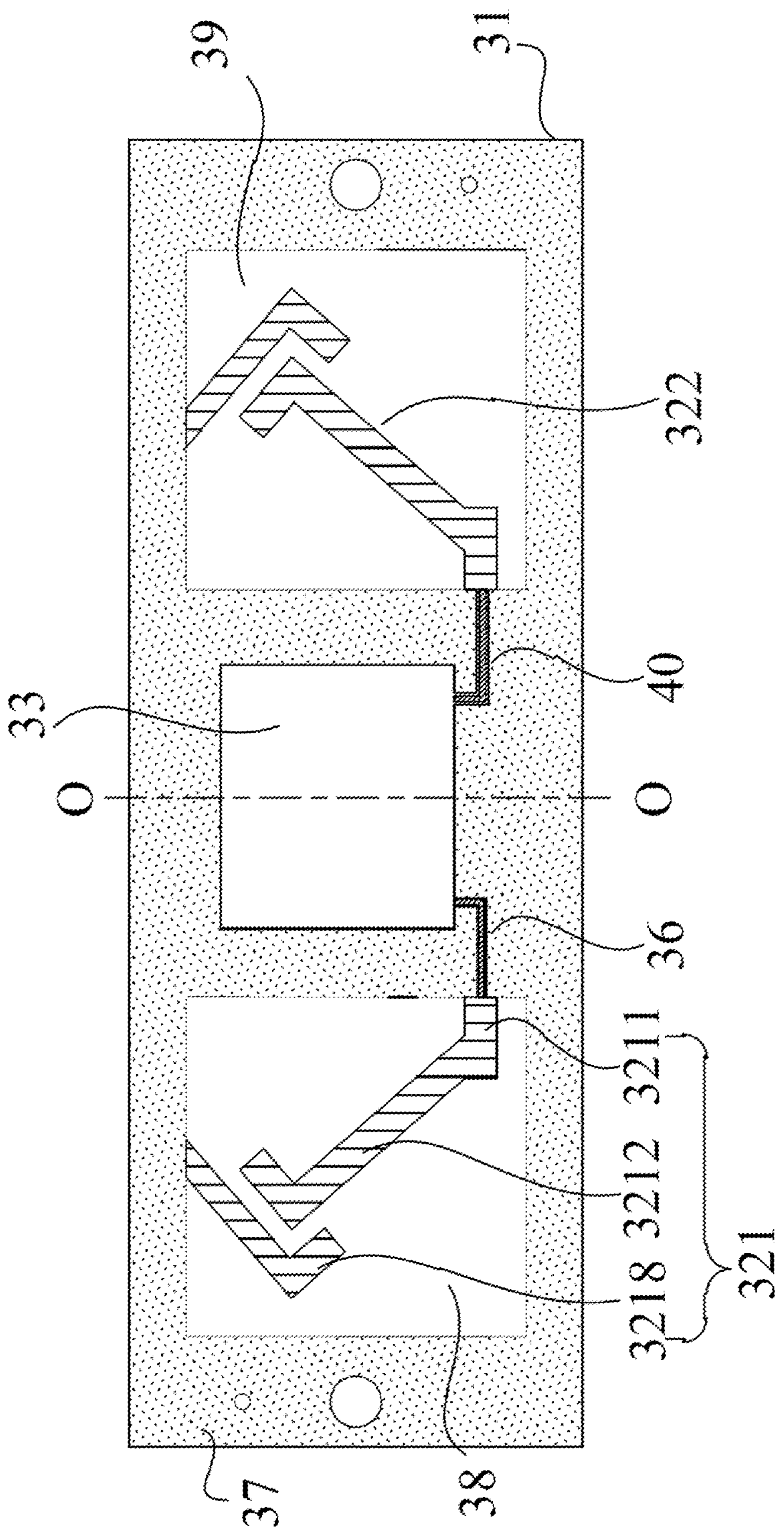
Figure 22:
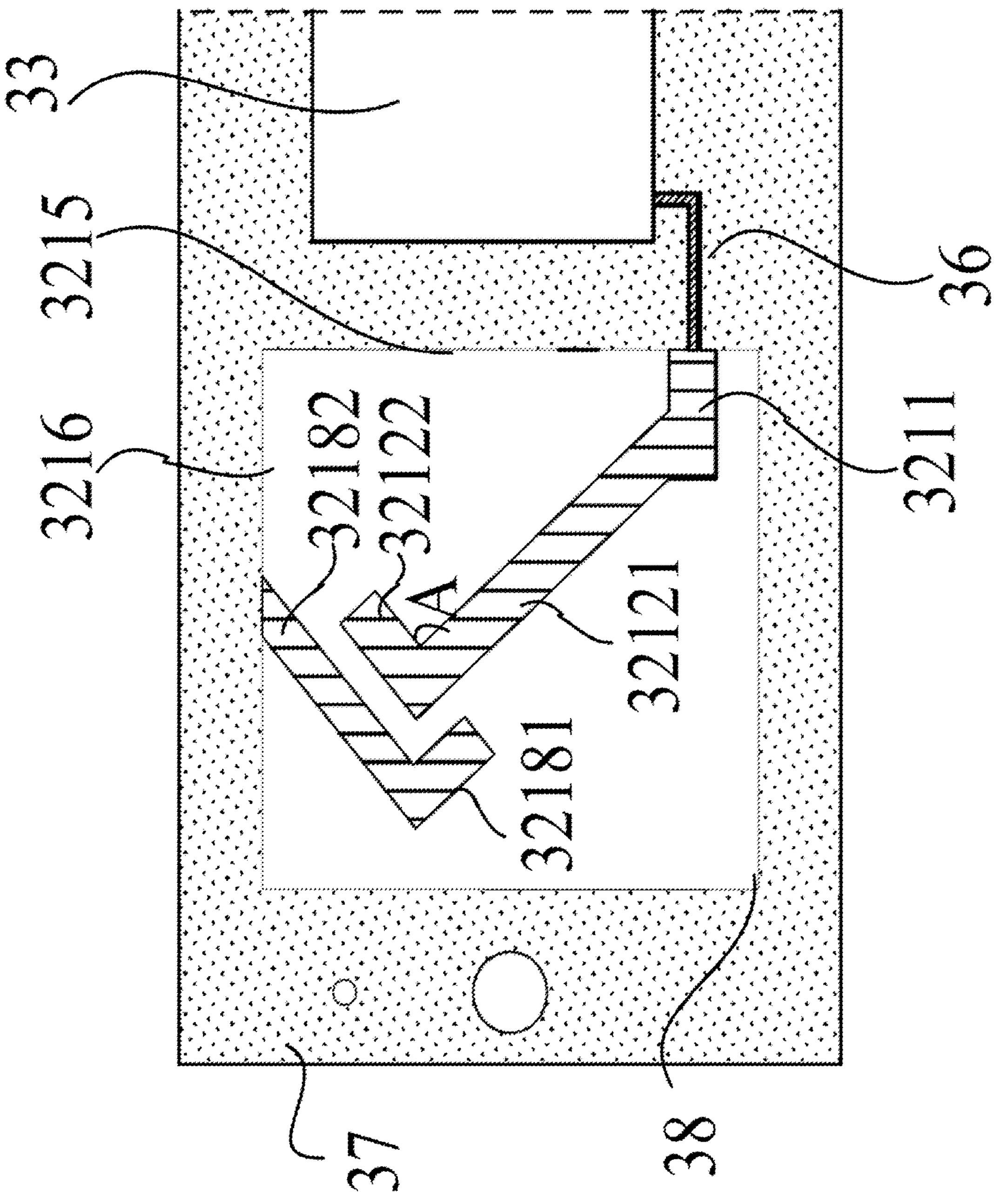

FIGS. 21 and 22 are schematic diagrams of an antenna assembly 3 according to another embodiment of the present disclosure. As shown in FIG. 21, the antenna assembly 3 includes a first antenna unit 321 and a second antenna unit 322 disposed on the dielectric substrate 31. The first antenna unit 321 and the second antenna unit 322 are arranged in a mirror image relative to the center line O-O of the radio frequency chip 33.

FIG. 22 is a schematic diagram of structure of the first antenna unit 321. The first antenna unit 321 includes a first feeder stub 3211, a first L-shaped stub 3212 and an L-shaped ground stub 3218.

The first feeder stub 3211 extends from the first boundary 3215 into the first square clearance region 38, and is perpendicular to the first boundary 3215. The junction of the first feeder stub 3211 and the first boundary 3215 is connected with the first signal transmission line 36. The first boundary 3215 is an upright boundary close to the radio frequency chip 33.

The first L-shaped stub 3212 and the L-shaped ground stub 3218 are located on a side of the first feeder stub 3211 close to the second boundary 3216. The first L-shaped stub 3212 includes a first stub 32121 and a second stub 32122. The first stub 32121 is connected with the first feeder stub 3211, and a connection point is located at an end of the first feeder stub 3211 away from the first boundary 3215. The first stub 32121 and the first feeder stub 3211 form an obtuse angle, and the first right angle A formed by the first stub 32121 and the second stub 32122 faces a first boundary 3215. The second border 3216 is a boundary adjacent to and perpendicular to the first boundary 3215.

The L-shaped ground stub 3218 includes a ninth stub 32181 and a tenth stub 32182. The ninth stub 32181 is located on a side of the first stub 32121 away from the first boundary 3215, and is arranged parallel to and spaced apart from the first stub 32121. The tenth stub 32182 is located on a side of the second stub 32122 away from the first feeder stub 3211, and is parallel to and spaced apart from the second stub 32122. The tenth stub 32182 extends to the second boundary 3216 so as to connect the surface covered with copper 37.

The structures of the first antenna unit 321 and the second antenna unit 322 in the antenna assembly 3 of the embodiment of the present disclosure have been described above with reference to FIGS. 17 to 21. In some implementations, those skilled in the art may further arrange antenna units with other structures. In addition, the structures of the first antenna unit 321 and the second antenna unit 322 may be the same or different, and the structures of the first antenna unit 321 and the second antenna unit 322 are not limited in this embodiment of the present disclosure.

The interactive white board of the embodiment of the present disclosure includes a display screen, a metal backboard, an antenna assembly, and a mainboard, wherein the metal backboard is located behind the display screen and is provided with through holes, the antenna assembly is provided on a surface of the metal backboard facing away from the display screen, and is located in the display region of the display screen, the antenna assembly is disposed directly opposite to the through holes, the mainboard is provided on the surface of the metal backboard facing away from the display screen, and the antenna assembly is electrically connected with the mainboard. In embodiments of the present disclosure, the antenna assembly is disposed in the display region of the display screen, and can radiate signals forward through the through holes on the metal backboard and the display screen, without occupying a frame region of the interactive white board, such that the frame can be made narrower, which improves a screen-to-body ratio of the interactive white board and even realizes a full-screen design.

In the explanation of this description, the description with reference to the terms “embodiment,” “example,” etc. means that the concrete feature, structure, material or characteristic described in conjunction with the embodiment or example is contained in at least one embodiment or example of the present disclosure. In this description, the schematic representation of the above-mentioned terms does not necessarily refer to the same embodiment or example.

In addition, it should be understood that although this description is described in accordance with the implementation approaches, not each implementation approach only contains an independent technical solution, and this narration approach in the description is only for clarity of the device. Those skilled in the art should regard the description as a whole, and the technical solutions in the various embodiments can also be appropriately combined to form other implementation approaches that can be understood by those skilled in the art.

The technical principle of the present disclosure has been described above in combination with concrete embodiments. These descriptions are only for the purpose of explaining the principles of the present disclosure and cannot be interpreted in any way as limiting the claimed scope of the present disclosure. Based on the explanation herein, those skilled in the art can associate other concrete embodiments of the present disclosure without creative labor, which will fall within the claimed scope of the present disclosure.

What is claimed is:

1. An interactive white board, comprising:

a display screen;

a metal backboard located on a back surface of the display screen, the metal backboard being provided with through holes;

an antenna assembly disposed on a surface of the metal backboard facing away from the display screen and located in a display region of the display screen, the antenna assembly being disposed directly opposite to the through holes; and a mainboard provided on the surface of the metal backboard facing away from the display screen, the mainboard being electrically connected with the antenna assembly.

2. The interactive white board according to claim 1, wherein the display screen comprises a backlight layer, the backlight layer comprises a plurality of light bars arranged in an array, and a projection of the through holes in the backlight layer is between the two light bars.

3. The interactive white board according to claim 1, wherein the antenna assembly comprises a dielectric substrate and an antenna unit disposed on the dielectric substrate, the antenna assembly is connected with the metal backboard through the dielectric substrate, and the antenna unit is arranged directly opposite to the through holes.

4. The interactive white board according to claim 3, wherein the dielectric substrate and the metal backboard are detachably connected.

5. The interactive white board according to claim 3, wherein a plurality of bulges are provided on the surface of the metal backboard facing away from the display screen, the bulges are provided with internal threads, the dielectric substrate is located on the bulges, and the dielectric substrate and the bulges are connected by screws.

6. The interactive white board according to claim 5, wherein a conductor is provided between the dielectric substrate and the metal backboard, and the conductor is around the dielectric substrate.

7. The interactive white board according to claim 3, wherein the dielectric substrate is provided with lock holes, the metal backboard is provided with extruded holes matching with the lock holes, the extruded holes are provided with internal threads, and the extruded holes are inserted into the lock holes so as to connect the dielectric substrate and the metal backboard by screws.

8. The interactive white board according to claim 7, wherein a conductor is provided between the dielectric substrate and the metal backboard, and the conductor is around the dielectric substrate.

9. The interactive white board according to claim 3, wherein the antenna assembly further comprises a first metal shielding cover, and the first metal shielding cover covers the dielectric substrate.

10. The interactive white board according to claim 9, wherein the number of antenna units on the antenna assembly is two or more, the antenna assembly further comprises a second metal shielding cover, and each second metal shielding cover covers one antenna unit.

11. The interactive white board according to claim 3, wherein the antenna assembly further comprises a radio frequency chip disposed on the dielectric substrate, and the antenna unit is connected with the radio frequency chip.

12. The interactive white board according to claim 11, wherein the radio frequency chip and the antenna unit are located on the same surface of the dielectric substrate.

13. The interactive white board according to claim 12, wherein the antenna units comprise a first antenna unit and a second antenna unit, and the first antenna unit and the second antenna unit are located on two sides of the radio frequency chip respectively.

14. The interactive white board according to claim 13, wherein the dielectric substrate is provided with a first square clearance region and a second square clearance region located on two sides of the radio frequency chip and on a surface covered with copper, the first antenna unit is located in the square clearance region, and the second antenna unit is located in the second square clearance region.

15. The interactive white board according to claim 14, wherein the first antenna unit comprises a first feeder stub, a first L-shaped stub, a first T-shaped stub, and a first ground stub;

the first feeder stub extends from a first boundary into the first square clearance region and is perpendicular to the first boundary, a junction between the first feeder stub and the first boundary is connected with a first signal transmission line, and the first boundary is an upright boundary close to the radio frequency chip;

the first L-shaped stub, the first T-shaped stub and the first ground stub are located on a side of the first feeder stub away from the second boundary, the second boundary is a boundary adjacent to and perpendicular to the first boundary, the first L-shaped stub comprises a first stub and a second stub, the first stub is connected with the first feeder stub, and a connection point is located between two ends of the first feeder stub, the first stub and the first feeder stub form an obtuse angle, and a first right angle formed by the first stub and the second stub faces the first boundary;

the first T-shaped stub comprises a third stub and a fourth stub, the third stub is located on a side of the first stub away from the first boundary, and is arranged parallel to and spaced apart from the first stub, the fourth stub is located on a side of the second stub away from the first feeder stub, and is arranged parallel to and spaced apart from the second stub, the fourth stub extends to a third boundary so as to connect the surface covered with copper, and the third boundary is a boundary parallel to the second boundary; and the first ground stub comprises a fifth stub and a sixth stub, the fifth stub extends from the first boundary into the first square clearance region and is parallel to the first feeder stub, and the sixth stub is arranged parallel to and spaced apart from the first stub.

16. The interactive white board according to claim 15, wherein the second antenna unit comprises a second feeder stub, a second L-shaped stub, a second T-shaped stub, and a second ground stub;

the second feeder stub and the first feeder stub are arranged in a mirror image with the radio frequency chip as a center, the second T-shaped stub and the first T-shaped stub are arranged in a mirror image with the radio frequency chip as a center, and the second ground stub and the first ground stub are arranged in a mirror image with the radio frequency chip as a center; and the second L-shaped stub comprises a seventh stub and an eighth stub, the seventh stub is connected with the second feeder stub, and a connection point is located at one end of the second feeder stub away from a fourth boundary, the seventh stub and the second feeder stub form an obtuse angle, a second right angle formed by the seventh stub and the eighth stub faces the fourth boundary, and the fourth boundary is an upright boundary in the second square clearance region close to the radio frequency chip.

17. The interactive white board according to claim 14, wherein the first antenna unit comprises a first feeder stub, a first L-shaped stub, and an L-shaped ground stub;

the first feeder stub extends from a first boundary into the first square clearance region, and is perpendicular to the first boundary, a junction between the first feeder stub and the first boundary is connected with a first signal transmission line, the first boundary is an upright boundary close to the radio frequency chip, and a second boundary is a boundary adjacent to and perpendicular to the first boundary;

the first L-shaped stub and the L-shaped ground stub are located on a side of the first feeder stub close to the second boundary, the first L-shaped stub comprises a first stub and a second stub, the first stub is connected with the first feeder stub, and a connection point is located at an end of the first feeder stub away from the first boundary, the first stub and the first feeder stub form an obtuse angle, and a first right angle formed by the first stub and the second stub faces the first boundary; and the L-shaped ground stub comprises a ninth stub and a tenth stub, the ninth stub is located on a side of the first stub away from the first boundary, and is arranged parallel to and spaced apart from the first stub, the tenth stub is located on a side of the second stub away from the first feeder stub, and is parallel to and spaced apart from the second stub, and the tenth stub extends to the second boundary so as to connect the surface covered with copper.

18. The interactive white board according to claim 15, wherein the second feeder stub and the first feeder stub are arranged in a mirror image with the radio frequency chip as a center.

19. The interactive white board according to claim 13, wherein the first antenna unit and the second antenna unit are Wi-Fi antenna units.

20. The interactive white board according to claim 13, wherein first radiation frequency bands of the first antenna unit and the second antenna unit are Wi-Fi 2.4G frequency bands, and second radiation frequency bands of the first antenna unit and the second antenna unit are Wi-Fi 5G frequency bands.

21. The interactive white board according to claim 1, further comprising a decorative piece, wherein the decorative piece is connected with the metal backboard and covers the antenna assembly.

22. The interactive white board according to claim 21, wherein the decorative piece is made of metal.

23. The interactive white board according to claim 1, further comprising a metal back cover, wherein the metal back cover is connected with the metal backboard and covers the mainboard.

24. The interactive white board according to claim 23, wherein the antenna assembly is located outside a region covered by the metal back cover.

25. The interactive white board according to claim 23, wherein the antenna assembly is located in a region covered by the metal back cover.

26. The interactive white board according to claim 23, wherein the antenna assembly comprises a first antenna assembly and a second antenna assembly, the first antenna assembly is located in a region covered by the metal back cover, and the second antenna assembly is located outside the region covered by the metal back cover.

27. The interactive white board according to claim 26, wherein the first antenna assembly comprises an Access Point (AP) antenna assembly, and the second antenna assembly comprises a Wi-Fi antenna assembly.

28. The interactive white board according to claim 1, wherein a spray-painting layer is provided in a region of the metal backboard which is outside a region covered by the antenna assembly.

* * * * *